US010942854B2

(12) United States Patent
Hasbun et al.

(10) Patent No.: US 10,942,854 B2
(45) Date of Patent: Mar. 9, 2021

(54) PREFETCH MANAGEMENT FOR MEMORY

(71) Applicant: Micron Technology, Inc., Boise, ID (US)

(72) Inventors: Robert Nasry Hasbun, San Jose, CA (US); Dean D. Gans, Nampa, ID (US); Sharookh Daruwalla, San Ramon, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/975,614

(22) Filed: May 9, 2018

(65) Prior Publication Data

US 2019/0347201 A1    Nov. 14, 2019

(51) Int. Cl.
G06F 12/0862    (2016.01)

(52) U.S. Cl.
CPC .. G06F 12/0862 (2013.01); *G06F 2212/6022* (2013.01); *G06F 2212/652* (2013.01)

(58) Field of Classification Search
CPC ........... G06F 12/0862; G06F 2212/652; G06F 2212/1028; G06F 2212/6022; G06F 13/20
See application file for complete search history.

(56) References Cited

U.S. PATENT DOCUMENTS

| 6,115,760 | A  | 9/2000 | Lo et al. |
| 6,249,461 | B1 | 6/2001 | Choi et al. |
| 6,353,874 | B1 | 3/2002 | Morein |
| 6,453,389 | B1 | 9/2002 | Weinberger et al. |
| 6,692,976 | B1 | 2/2004 | Mirkarimi |
| 6,963,954 | B1 | 11/2005 | Trehus et al. |
| 7,089,331 | B1 | 8/2006 | Gollapudi et al. |
| 7,620,748 | B1 | 11/2009 | Bruce et al. |
| 8,549,210 | B2 | 10/2013 | Hunter et al. |
| 8,788,765 | B2 | 7/2014 | Jeddeloh |
| 8,959,307 | B1 | 2/2015 | Bruce et al. |
| 9,780,782 | B2 | 10/2017 | Bains et al. |
| 2003/0105926 | A1 | 6/2003 | Rodriguez |

(Continued)

FOREIGN PATENT DOCUMENTS

| WO | 2016097809 A1 | 6/2016 |
| WO | 2017131871 A1 | 8/2017 |

OTHER PUBLICATIONS

U.S. Appl. No. 15/630,330, filed Jun. 22, 2017.

(Continued)

*Primary Examiner* — Jane Wei

(74) *Attorney, Agent, or Firm* — Holland & Hart LLP

(57) ABSTRACT

Methods, systems, and devices are described for wireless communications. A request for data located in a memory page of a memory array may be received at a device, and a value of a prefetch counter associated with the memory page may be identified. A portion of the memory page that includes the requested data may then be communicated between a memory array and memory bank of the device based on the value of the prefetch counter. For instance, the portion of the memory page may be selected based on the value of the prefetch counter. A second portion of the memory page may be communicated to a buffer of the device, and the value of the prefetch counter may be modified based on a relationship between the first portion of the memory page and the second portion of the memory page.

18 Claims, 9 Drawing Sheets

(56) References Cited

U.S. PATENT DOCUMENTS

| | | |
|---|---|---|
| 2004/0128449 A1 | 7/2004 | Osborne et al. |
| 2004/0141374 A1 | 7/2004 | Park et al. |
| 2006/0053256 A1 | 3/2006 | Moyer et al. |
| 2006/0125835 A1 | 6/2006 | Sha et al. |
| 2006/0259735 A1 | 11/2006 | Anand et al. |
| 2006/0265552 A1* | 11/2006 | Davis ................... G06F 12/0862 711/137 |
| 2007/0011421 A1 | 1/2007 | Keller et al. |
| 2007/0038829 A1 | 2/2007 | Tousek |
| 2007/0067382 A1 | 3/2007 | Sun |
| 2008/0183977 A1 | 7/2008 | Gower et al. |
| 2009/0063734 A1 | 3/2009 | Kurata et al. |
| 2009/0196102 A1* | 8/2009 | Kim ..................... G11C 7/1045 365/185.11 |
| 2010/0268886 A1 | 10/2010 | Frey et al. |
| 2010/0293337 A1* | 11/2010 | Murphy ............... G06F 12/0866 711/136 |
| 2012/0185651 A1 | 7/2012 | Kimori |
| 2012/0290768 A1 | 11/2012 | Rubowitz |
| 2014/0040561 A1 | 2/2014 | Lih et al. |
| 2014/0115294 A1 | 4/2014 | Fleischer et al. |
| 2014/0237205 A1 | 8/2014 | Takefman et al. |
| 2015/0347013 A1* | 12/2015 | Mathur ............... G06F 12/0862 711/103 |
| 2015/0371689 A1 | 12/2015 | Li et al. |
| 2016/0117131 A1 | 4/2016 | Karamcheti et al. |
| 2016/0350236 A1 | 12/2016 | Tsirkin et al. |
| 2017/0068467 A1 | 3/2017 | Rothberg |
| 2017/0123988 A1 | 5/2017 | Chun et al. |
| 2018/0121106 A1 | 5/2018 | Kim |
| 2018/0165211 A1 | 6/2018 | Wang et al. |
| 2018/0373313 A1 | 12/2018 | Hasbun |
| 2018/0373641 A1 | 12/2018 | Partap Singh et al. |
| 2019/0004796 A1* | 1/2019 | Pelster ................ G06F 9/30003 |

OTHER PUBLICATIONS

ISA/KR, International Search Report and Written Opinion of the International Searching Authority, Int'l Appl. No. PCT/US2019/028841, dated Sep. 24, 2019, Korean Intellectual Property Office, Seo-gu, Daejeon, Republic of Korea, 13 pgs.

ISA/KR, International Search Report and Written Opinion of the International Searching Authority, Int'l Appl. No. PCT/US2019/028843, dated Sep. 26, 2019, Korean Intellectual Property Office, Seo-gu, Daejeon, Republic of Korea, 15 pgs.

ISA/KR, International Search Report and Written Opinion of the International Searching Authority, Int'l. Appl. No. PCT/US2019/028683, dated Aug. 27, 2019, Korean Intellectual Property Office, Seo-gu, Daejeon, Republic of Korea, 12 pgs.

ISA/KR, International Search Report and Written Opinion of the International Searching Authority, Int'l. Appl. No. PCT/US2019/028688, dated Aug. 29, 2019, Korean Intellectual Property Office, Seo-gu, Daejeon, Republic of Korea, 12 pgs.

* cited by examiner

PREFETCH MANAGEMENT FOR MEMORY

BACKGROUND

The following relates generally to memory systems and more specifically to prefetch management for memory.

A memory system may include various kinds of memory devices and controllers, which may be coupled via one or more buses to manage information in numerous electronic devices such as computers, wireless communication devices, internet of things devices, cameras, digital displays, and the like. Memory devices are widely used to store information in such electronic devices. Information may be stored in a memory device by programming different states of one or more memory cells within the memory device. For example, a binary memory cell may store one of two states, often denoted as a logic "1" or a logic "0." Some memory cells may be able to store more than two states.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory cells may maintain their stored logic state for extended periods of time even in the absence of an external power source. Volatile memory cells, e.g., DRAM cells, may lose their stored logic state over time unless they are periodically refreshed by an external power source.

Improving memory systems, generally, may include reducing system power consumption, increasing memory system capacity, improving read/write speeds, providing non-volatility by use of persistent main memory, or reducing manufacturing costs at a certain performance point, among other metrics. Memory page size may affect system power and power used to access a memory device. Moreover, system power may be affected or increased if memory accesses are not tailored for particular systems.

DETAILED DESCRIPTION

Figure 1:
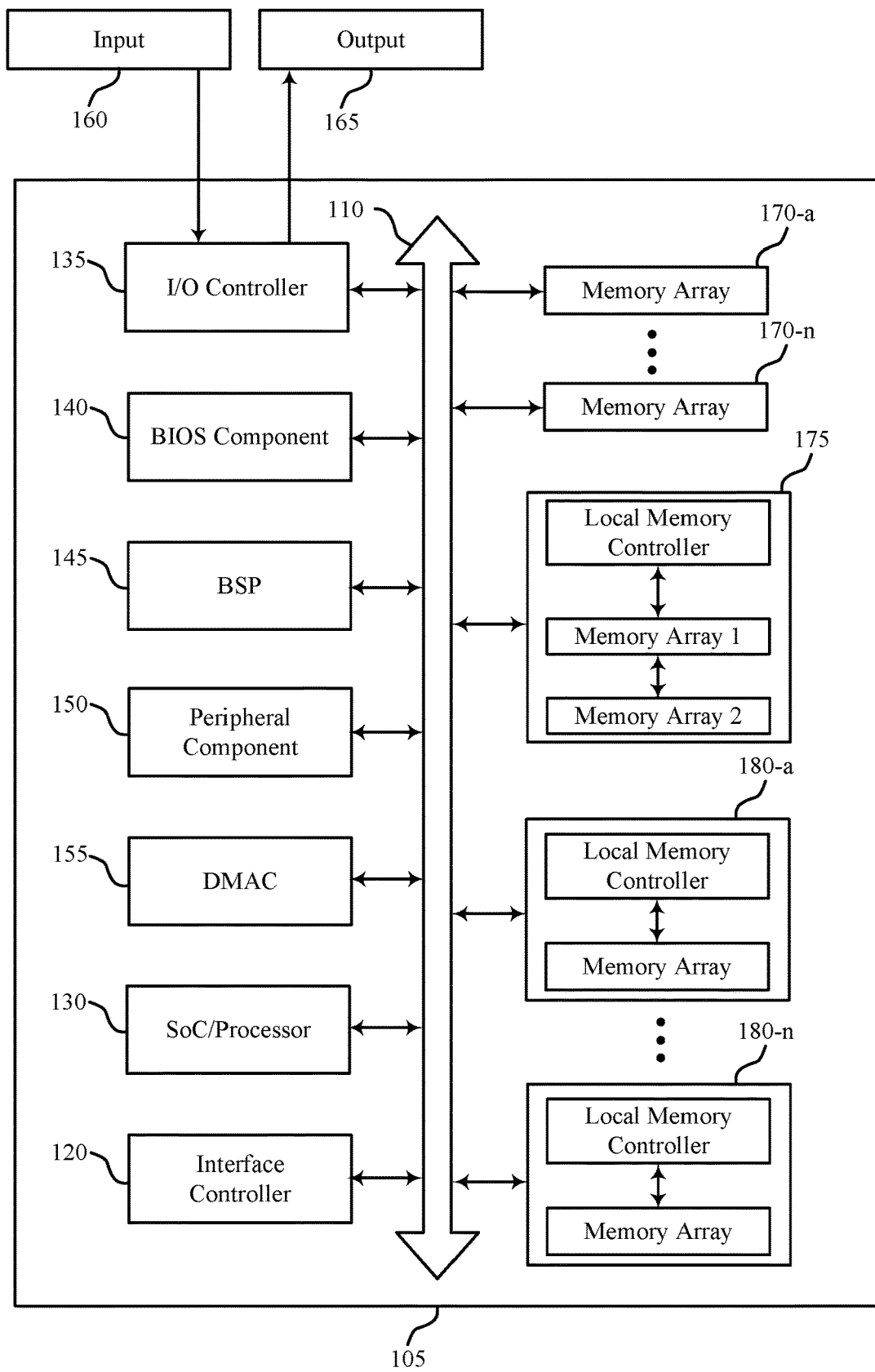
FIG. 1 shows a diagram of a system including a non-volatile memory system or sub-system that supports prefetch management for main memory in accordance with examples of the present disclosure.

A memory system may utilize different memory technologies to store data. For example, a memory system may include a first memory array (which may be a volatile memory array, like DRAM) and a second memory array (which may be a non-volatile memory array, like FeRAM or 3D XPoint™). The volatile memory array may perform communications with an external processor using less latency than the non-volatile memory array. Also, in some cases, access operations (e.g., read/write operations) performed on the volatile memory array may consume less power than access operations performed on the non-volatile memory array. The non-volatile memory array, however, may reduce long-term power consumption relative to the volatile memory array—e.g., by reducing or eliminating various refresh operations. And unlike the volatile memory array, the non-volatile memory array may retain stored data if the non-volatile memory array loses power. In some cases, the memory system may be configured and operable to leverage beneficial characteristics of both of these technologies.

For example, the memory system may store a majority of data in the non-volatile memory array and may strategically move data to the volatile memory array. In some cases, the memory system may preemptively move data stored in the non-volatile memory array and likely to be accessed to the volatile memory array before receiving an access request for the data. This operation may be referred to as a "prefetch" operation. During a prefetch operation, the memory system may move, from the non-volatile memory array to the volatile memory array, one or more pages of data (or a "page" or "memory page") that are likely to be accessed. In this way, the memory system may reduce access operations performed on the non-volatile memory array, and thus, increase data throughput of the memory system by leveraging the relatively faster timing associated with accessing the volatile memory array.

Additionally or alternatively, the memory system may perform partial prefetch operations. For example, the memory system may prefetch a portion of a memory page as opposed to a full memory page. In some cases, the memory system may prefetch a portion of a memory page based on prior access operations performed on data stored in the non-volatile memory array (i.e., based on access history). In this way, the non-volatile memory array may determine which portions of the memory page are likely to be accessed based on previous access operations, and may provide the portions of a memory page that are likely to be accessed to the volatile memory array. For example, the memory system may determine that two portions of a non-volatile memory page are often accessed together and may cause the non-volatile memory array to deliver, to the volatile memory array, data corresponding to both portions of the non-volatile memory page when either portion of the memory page is accessed. In some cases, a memory page may be partitioned into memory subpages (or "subpages") and a portion of a memory page may correspond to one or more subpages.

As discussed above, a memory system may include a volatile memory array and a non-volatile memory array. The volatile memory array may be configured with one or more memory pages having a first size, and a device may store data in the memory array according to the page size. In some examples, the volatile memory array may be a dynamic random access memory (DRAM) array and may use memory pages having a page size of 2048 bytes, for example. In some cases, a device may request data stored in the volatile memory array to support the operation of a user application related to the device. For example, a processor at the device may initiate a read operation at the volatile memory array, and the volatile memory array may provide the requested data to the processor. The volatile memory array may identify a memory page that includes the requested data and may access the entire memory page before providing the requested data to the processor. The processor may communicate with the volatile memory array according to a certain protocol (e.g., DRAM memory access protocols) that is associated with specified voltage and timing requirements.

The non-volatile memory array may store data in memory pages using a second predetermined size or a variable size. The non-volatile memory array may in some cases use smaller page sizes (e.g., 64 bytes, 128 bytes, 192 bytes, or 256 bytes) than the volatile array. Moreover, unlike a DRAM array, the non-volatile memory array may access one or more portions (e.g., multiple 64 byte portions) of a memory page without disturbing the logic states of other memory cells in the portion. Accessing fewer memory cells during a read operation may decrease power consumption of the non-volatile memory array. The non-volatile memory array may, however, be incompatible with certain memory access protocols (e.g., DRAM memory access protocols). For instance, the non-volatile memory array may be accessed using different voltages and/or timing than a DRAM array. Thus, the non-volatile memory array may not be directly accessible by a processor that is configured to communicate using DRAM memory access protocols.

The non-volatile memory array, despite having a smaller page size than the volatile memory array, may have a larger storage capacity than the volatile memory array. A processor that operates according to certain memory access protocols may have direct access to the volatile memory array and indirect access to the non-volatile memory array (e.g., through a memory controller). In some examples, the processor may be configured to communicate with the memory system as a single memory array and sends access requests using a first memory access protocol (e.g., a DRAM memory access protocol). A memory controller may interpret access requests from the processor and provide the requested data to the processor. In some cases, data stored in the volatile memory array may be accessed using and within the specifications of the memory access protocol of the processor, while data stored in the non-volatile memory array may not be accessible within the specification of the memory access protocol used by the processor—e.g., due to the non-volatile memory array using an alternative memory technology.

An indication that there will be a delay in acquiring the requested data may be sent to the processor when the memory system is unable to retrieve the requested data within a designated period of time. For example, the memory controller may indicate a read delay when the processor requests data that is stored in the non-volatile memory array and not in the volatile memory array—e.g., due to slower timing for accessing data in the non-volatile memory array. The processor may wait an additional amount of time for the data after receiving the indication, and the requested data may be provided to the processor according to the modified timing. In some examples, the requested data may also be moved to the volatile memory array in anticipation of receiving a subsequent access request for the data from the processor.

As discussed above and in some examples, certain memory pages stored in the non-volatile memory array may be preemptively moved to the volatile memory array to avoid future access delays before the data otherwise located in the memory pages is requested (i.e., the data may be prefetched). In some examples, access patterns for data stored in the non-volatile memory array are monitored to dynamically determine which memory pages to move to the volatile memory array—e.g., to determine which memory pages contain data that is likely to be accessed within a certain period of time. For example, a counter (which may be referred to as a "saturation counter") may be used to monitor the number of times data in a certain memory page is accessed within a certain period of time or cycle, and the memory page may be moved from the non-volatile memory array to the volatile memory array based on a value of the counter.

Power consumption may be further reduced by prefetching portions of a memory page instead of prefetching an entire memory page. A prefetched portion of the memory page may be selected based on the access history of data in the memory page. As discussed above, the prefetched portion may include one or more subpages of the memory page. For instance, portions of a memory page that are frequently accessed or that have been accessed a certain number of times may be prefetched. In some examples, a value of a counter (which may be referred to as a "prefetch counter") may be used to indicate how many and/or which subpages of a memory page to move from the non-volatile memory array to the volatile memory array. Each memory page may be associated with a prefetch counter, and the value of a respective prefetch counter may be adapted based on access history, or access patterns, or both, of the respective memory page. In some examples, the memory controller may include a respective saturation counter for each of the subpages and the value of the prefetch counter may be based on the values of the saturation counters.

In some examples, a portion of a memory page may be communicated from a non-volatile memory array to a volatile memory array based on receiving a request for data located in the memory page and a value of a prefetch counter. For example, a request for data from a processor may be received and a memory page of the non-volatile memory array that contains the data may be identified. In some examples, the subpage that includes the requested data and a value of a prefetch counter associated with the memory page may also be identified. The identified subpage and the value of the prefetch counter may be used to determine which portion of the memory page, or a size of a portion of the memory page, to communicate between the non-volatile memory array and the volatile memory array.

In some examples, a memory system may include a memory buffer (or "buffer"), in addition to the volatile memory array and the non-volatile memory array. In some cases, the buffer may also be a volatile memory array. The memory system may update a value of a prefetch counter based on which subpages are transmitted to the buffer. For instance, a portion of a memory page including three subpages of data (which may correspond to 192 bytes of data) may be transmitted to the volatile memory array based on a value of a corresponding prefetch counter. Subsequently, a number of access operations performed on each of the subpages at the volatile memory array may be monitored. In some examples, data corresponding to only two of the three subpages may be transmitted from the volatile memory array to the buffer and the value of the corresponding prefetch counter may be modified. For example, the prefetch counter may be modified so that a portion of the memory page including two subpages of data (which may correspond to 128 bytes of data), instead of three subpages, is transmitted from the non-volatile memory array to the volatile memory array the next time the memory page is accessed. In some cases, the prefetch counter value is not updated until the subpages stored in the buffer are evicted.

Features of the disclosure introduced above are further described below at an exemplary system level in the context of FIG. 1. Specific examples of memory systems and operations are then described in the context of FIGS. 2 through 4. These and other features of the disclosure are further illustrated by and described with reference to the apparatus diagram of FIG. 5, which describe various components related controllers, as well as flowcharts of FIGS. 6 through 8, which relate to operations of prefetch management for main memory.

FIG. 1 shows a diagram of a system 100 including a memory system or sub-system that supports prefetch management for main memory in accordance with examples of the present disclosure. System 100 may include device 105. Device 105 may include an interface controller 120, an SoC or processor 130, and various memory devices 170, 175, and 180. Device 105 may also include an input/output controller 135, a basic input/output system (BIOS) component 140, a board support package (BSP) 145, peripheral component(s) 150, and a direct memory access controller (DMAC) 155. The components of device 105 may be in electronic communication with one another through a bus 110.

Device 105 may be a computing device, electronic device, mobile computing device, or wireless device. Device 105 may be a portable electronic device. For example, device 105 may be a computer, a laptop computer, a tablet computer, a smartphone, a cellular phone, a wearable device, an internet-connected device, or the like. In some examples, device 105 may be configured for bi-directional wireless communication via a base station or access point. In some examples, device 105 may be capable of machine-type communication (MTC), machine-to-machine (M2M) communication, or device-to-device (D2D) communication. Device 105 may be referred to as a user equipment (UE), station (STA), mobile terminal, or the like.

Interface controller 120 may be configured to interface with SoC/processor 130. Interface controller 120 may also be configured to interface with various memory devices 170, 175, 180, or any combination thereof.

SoC/processor 130 may be configured to operate with various memory devices 170, 175, 180, or any combination thereof—either directly or via interface controller 120. SoC/processor 130 may also be referred to as a host, and may include a host controller. In some cases, SoC/processor 130 may perform some or all of the functions of interface controller 120 described herein. SoC/processor 130 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components.

Memory devices 170 may each include an array or arrays of memory cells to store digital information. Memory devices 170 may be configured to each operate with SoC/processor 130 and/or interface controller 120. In some examples, memory devices 170 may be configured to provide buffer memory for a memory bank for SoC/processor 130 or interface controller 120. Device 105 may include any number of memory devices 170.

Memory device 175 may include an array of memory cells and a local memory controller configured to operate with the array of memory cells. The array of memory cells included in memory device 175 may be structured in two or more tiers, which may each have different performance capabilities. The local memory controller of memory device 175 may also be configured to operate with SoC/processor 130 or interface controller 120. In some examples, first-tier memory cells may be 3D XPoint™ memory, which may provide a high number of input/output operations per second (IOPS) with a short response time to handle various workloads. In some examples, second-tier memory cells may be three-dimensional Not-AND (NAND) memory, which may provide high capacity for data storage at a relatively lower cost than the first-tier memory cells. The local memory controller of memory device 175 may be configured to facilitate the efficient operation of memory cells within memory device 175, which may have different characteristics among memory cells in the two or more tiers, with SoC/processor 130. Memory device 175 may include other types or combinations of memory arrays in some cases. In some examples, one or more memory devices 175 may be present in device 105.

Memory devices 180 may include one or more arrays of memory cells and a local memory controller configured to operate with the one or more arrays of memory cells. The local memory controller of a memory device 180 may also be configured to operate with SoC/processor 130 or interface controller 120. In some examples, a memory device 180 may include non-volatile or volatile memory cells, or a combination of both non-volatile and volatile memory cells. A non-volatile memory cell (e.g., an FeRAM memory cell) may maintain its stored logic state for an extended period of time in the absence of an external power source, thereby reducing or eliminating requirements to perform refresh operations (e.g., refresh operations such as those associated with DRAM cells).

The inclusion of an array of non-volatile memory cells (e.g., FeRAM memory cells) in a memory device 180 may provide various benefits (e.g., efficiency benefits) for device 105. Such benefits may include near-zero standby power (which may increase battery life), instant-on operation following a standby or un-powered (e.g., "off") state, and/or high areal memory density with low system power consumption relative to an array of volatile memory cells. Such features of non-volatile memory system or sub-system may, for example, support the use of computationally intensive (e.g., desktop applications) operations or software in mobile environments. In some examples, one or more memory devices 180 may be present in device 105. In some cases, device 105 may include multiple kinds of non-volatile memory arrays employing different non-volatile memory technologies, such as one or more FeRAM arrays along with one or more non-volatile memory arrays using other memory technology. Further, the benefits described herein are merely exemplary, and one of ordinary skill in the art may appreciate further benefits.

In some cases, a memory device 180 may use a different page size than SoC/processor 130. In the context of a memory device, a page size may refer to a size of data handled at various interfaces, and different memory device types may have different page sizes. In some examples, SoC/processor 130 may use a DRAM page size (e.g., a page size in accord with one or more JEDEC low power double data rate (LPDDR) specifications), and a device 180 within device 105 may include an array of non-volatile memory cells that are configured to provide a different page size (e.g., a page size smaller than a typical DRAM page size). In some examples, a memory device 180 may support a variable page size—e.g., a memory device 180 may include an array of non-volatile memory cells (e.g., an FeRAM array) that supports multiple page sizes, and the page size used may vary from one access operation to another—and the local memory controller of memory device 180 may be configured to handle a variable page size for a memory array within memory device 180. For example, in some cases, a subset of non-volatile memory cells connected to an activated word line may be sensed simultaneously without having to sense all non-volatile memory cells connected to the activated word line, thereby supporting variable page-size operations within memory device 180. In some cases, the page size for an array of non-volatile memory cells may vary dynamically depending on the nature of an access command and a characteristic of (e.g., size or associated latency) associated data (e.g., data subject to the access command). Smaller page size may provide benefits (e.g., efficiency benefits) as a smaller number of memory cells may be activated in connection with a given access operation. The use of variable page size may provide further benefits to device 105, such as configurable and efficient energy usage when an operation is associated with a small change in information by reducing the page size while supporting a high-performance operation by increasing the page size when desired.

In some examples, device 105 may employ "prefetching" techniques to facilitate communication with SoC/processor 130. For instance, device 105 may cause a memory device 180 to transmit data to memory device 175 that has not yet been requested by SoC/processor 130. In this way, SoC/processor 130 may access requested data located at memory device 175 using a first attempt instead of performing a delayed read operation to retrieve data from a memory device 180 using a second additional attempt. Moreover, SoC/processor 130 may access the data located in memory device 175 according to a memory access protocol configured at the SoC/processor 103.

Additionally or alternatively, device 105 may prefetch portions (e.g., subpages) of a memory page that includes data requested by SoC/processor 130. In this way, device 105 may further reduce power consumption and increase throughput at device 105. SoC/processor 130 may request data located in subpage of a memory page located at a memory device 180. The memory device 180 may transmit the subpage containing the requested data to SoC/processor 130 and/or memory device 175. In some examples, the memory device 180 may also transmit additional subpages in the memory page to memory device 175 together with (or, alternatively, in addition to) the subpage containing the requested data. In some cases, the decision to transmit additional subpages may be based on various factors or other indications (e.g., historical information related to access operations for the memory page). In some examples, a prefetch counter may be used to monitor past access operations performed on the subpages in the memory page. That is, a value of the prefetch counter may be updated (e.g., dynamically) based on prior and subsequent access operations performed on one or more subpages in the memory page. In some examples, each memory page may be associated with a respective prefetch counter.

DMAC 155 may support direct memory access (e.g., read or write) operations by SoC/processor 130 with respect to memory devices 170, 175, or 180. For example, DMAC 155 may support access by SoC/processor 130 of a memory device 170, 175, or 180 without the involvement or operation of interface controller 120.

Peripheral component(s) 150 may be any input or output device, or an interface for any such device, that may be integrated into device 105. Examples of peripheral component(s) 150 may include disk controllers, sound controllers, graphics controllers, Ethernet controllers, modems, universal serial bus (USB) controllers, serial or parallel ports, or peripheral card slots, such as peripheral component interconnect (PCI) or accelerated graphics port (AGP) slots. Peripheral component(s) 150 may also include other components understood by those skilled in the art as peripherals.

BIOS component 140 or board support package (BSP) 145 may be software components that include a basic input/output system (BIOS) operated as firmware, which may initialize and run various hardware components of system 100. BIOS component 140 or BSP 145 may also manage data flow between SoC/processor 130 and the various components, e.g., peripheral component(s) 150, input/output controller 135, etc. BIOS component 140 or BSP 145 may include a program or software stored in read-only memory (ROM), flash memory, or any other non-volatile memory. In some cases, BIOS component 140 and BSP 145 may be combined as a single component.

Input/output controller 135 may manage data communication between SoC/processor 130 and other devices, including peripheral component(s) 150, input devices 160, or output devices 165. Input/output controller 135 may also manage peripherals that are not integrated into device 105. In some cases, input/output controller 135 may include a physical connection or port to the external peripheral.

Input device 160 may represent a device or signal external to device 105 that provides input to device 105 or its components. In some cases, input device 160 may include a user interface or an interface with or between other devices (not shown in FIG. 1). In some cases, input device 160 may be a peripheral that interfaces with device 105 via peripheral component(s) 150 or is managed by input/output controller 135.

Output device 165 may represent a device or signal external to device 105 that is configured to receive output from device 105 or any of its components. For example, output device 165 may include a display, audio speakers, a printing device, or another processor on printed circuit board, etc. In some cases, output device 165 may be a peripheral that interfaces with device 105 via peripheral component(s) 150 or is managed by input/output controller 135.

The components of device 105 may be made up of general purpose or specialized circuitry designed to carry out their respective functions. This may include various circuit elements, for example, conductive lines, transistors, capacitors, inductors, resistors, amplifiers, or other active or passive elements configured to carry out the functions described herein.

Figure 2:
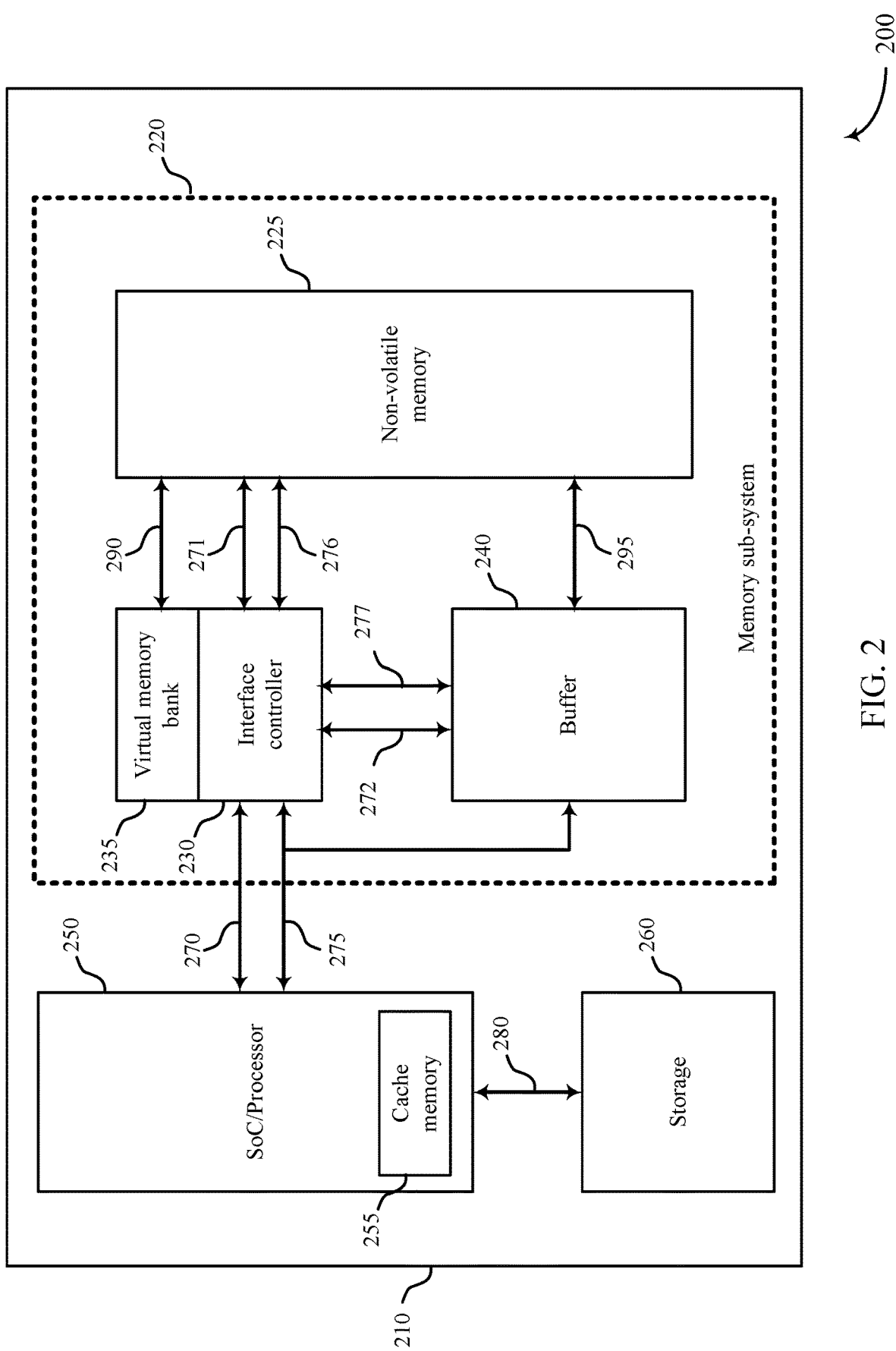
FIG. 2 illustrates an exemplary memory system or sub-system that supports prefetch management for main memory in accordance with examples of the present disclosure.

FIG. 2 illustrates an exemplary memory system or sub-system that supports prefetch management for main memory in accordance with examples of the present disclosure. System 200 may include aspects of system 100 as described with reference to FIG. 1 and may include a device 210. Device 210 may include aspects of device 105 as described with reference to FIG. 1. Device 210 may include memory sub-system 220, SoC/processor 250, and storage 260. SoC/processor 250 may be an example of an SoC/processor 130 as described with reference to FIG. 1. Memory sub-system 220 may be an example of a memory device 180 as described with reference to FIG. 1. Storage 260 may be an example of a memory device 175 as described with reference to FIG. 1.

SoC/processor 250 may be configured to operate with storage 260 via a bus 280 and with memory sub-system 220 via buses 270 and 275. In some examples, bus 280 may be configured to support periphery component interconnect express (PCIe) signaling. In other cases, bus 280 may employ another protocol, such as embedded Multi-media Control (eMMC), Universal Flash Storage (UFS), or the like. In some examples, bus 270 may be configured to support LPDDR command and address (CA) signaling, and bus 275 may be configured to support LPDDR input/output (I/O) signaling. In some examples, a local memory array may be disposed on a same substrate as SoC/processor 250 and may be configured to function as a cache memory 255 for SoC/processor 250.

Memory sub-system 220 may include non-volatile memory 225 and interface controller 230. Non-volatile memory 225 may be an example of a memory device 180 as described with reference to FIG. 1. Interface controller 230 may be an example of an interface controller 120 as described with reference to FIG. 1. Interface controller 230 may be configured to operate with SoC/processor 250 via buses 270 and 275 pursuant to an LPDDR specification (e.g., page size, timing requirements). Interface controller 230 may include virtual memory bank 235, which may be an example of a memory device 170 as described with reference to FIG. 1. In some examples, virtual memory bank 235 may include DRAM memory cells and may be configured to operate pursuant to an LPDDR specification. In some examples, virtual memory bank 235 may be disposed on a same substrate as interface controller 230. In addition, interface controller 230 may be configured to operate with non-volatile memory 225 via buses 271 and 276.

In some examples, memory sub-system 220 may further include buffer 240. In some examples, buffer 240 may include DRAM memory cells. Buffer 240 may be an example of a memory device 170 or a memory device 180 as described with reference to FIG. 1. In addition, interface controller 230 may be configured to operate with buffer 240 via buses 272 and 277. In some examples, bus 272 may be a buffer CA bus. In some examples, bus 277 may be an interface (IF) buffer I/O bus. Interface controller 230 and buses 272 and 277 may be compatible with DRAM protocols. For example, interface controller 230 and buses 272 and 277 may utilize LPDDR page sizes and timings. In some examples, SoC/processor 250 may be configured to directly operate with buffer 240 via bus 275. In some examples, buffer 240 may be configured to have a page size compatible with bus 275, which may support direct access of buffer 240 by SoC/processor 250.

Buffer 240 may in some cases be configured to operate as a logical augmentation of cache memory 255 within SoC/processor 250. In some examples, the capacity of buffer 240 may be on the order of 256 M bytes. In some examples, the capacity of buffer 240 may be based at least in part on the size of cache memory 255 in SoC/processor 250. In some cases, buffer 240 may have a relatively small capacity, which may facilitate improved (e.g., faster) performance of memory sub-system 220 relative to a DRAM device of a larger capacity due to potentially smaller parasitic components, e.g., inductance associated with metal lines. A smaller capacity of buffer 240 may also provide benefits in terms of reducing system power consumption associated with periodic refreshing operations.

Memory sub-system 220 may be implemented in various configurations, including one-chip versions and multi-chip versions. A one-chip version may include interface controller 230, virtual memory bank 235, and non-volatile memory 225 on a single chip. In some examples, buffer 240 may also be included on the single-chip. In contrast, a multi-chip version may include one or more constituents of memory sub-system 220, including interface controller 230, virtual memory bank 235, non-volatile memory 225, and buffer 240, in a chip that is separate from a chip that includes one or more other constituents of memory sub-system 220. For example, in one multi-chip version, respective separate chips may include each of interface controller 230, virtual memory bank 235, and non-volatile memory 225. As another example, a multi-chip version may include one chip that includes both virtual memory bank 235 and interface controller 230 and a separate chip that includes buffer 240. Additionally, a separate chip may include non-volatile memory 225.

Another example of a multi-chip version may include one chip that includes both buffer 240 and virtual memory bank 235. Additionally, a separate chip may include both interface controller 230 and non-volatile memory 225 or respective separate chips may include each of interface controller 230 and non-volatile memory 225. In yet another example of a multi-chip version, a single chip may include non-volatile memory 225 and buffer 240. Additionally, a separate chip may include both interface controller 230 and virtual memory bank 235 or respective separate chips may include each of interface controller 230 and virtual memory bank 235. In some examples, non-volatile memory 225 may include both an array of non-volatile memory cells and an array of DRAM cells. In some cases of a multi-chip version, interface controller 230, virtual memory bank 235, and buffer 240 may be disposed on a single chip and non-volatile memory 225 on a separate chip.

In some examples, non-volatile memory 225 may include an array of non-volatile memory cells (e.g., FeRAM memory cells) and, in some cases, may include a local memory controller (not shown). The non-volatile array included in non-volatile memory 225 may be configured to support fixed or variable page sizes (e.g., 64, 128, 192, or 256 bytes), which in some cases differ from a page size associated with SoC/processor 250. Further, interface controller 230, or in some cases a local memory controller included in non-volatile memory array 225, may be configured to determine a variable page size for non-volatile memory 225. Moreover, the non-volatile array may be configured with smaller page sizes (e.g., 64 bytes) than a DRAM array (2048 bytes), for example. In some examples, non-volatile memory 225 may be referred to as a non-volatile near memory to SoC/processor 250 (e.g., in comparison to storage 260). In the context of a memory system, a near memory may refer to a memory component placed near SoC/processor 250, logically and/or physically, to provide a faster access speed than other memory components. Configuring non-volatile memory 225 as a near memory for SoC/processor 250 may, for example, limit or avoid overhead that may be associated with SoC/processor 250 retrieving data from storage 260.

SoC/processor 250 may store critical information in non-volatile memory 225 upon unexpected power interruption instead of accessing storage 260, as accessing storage 260 may be associated with an undesired delay.

Interface controller 230 may be configured to operate with non-volatile memory 225 via buses 271 and 276. In some examples, bus 271 may be an FeRAM CA bus. In some examples, bus 276 may be an FeRAM interface (IF) bus. Interface controller 230 and buses 271 and 276 may be compatible with the page size of non-volatile memory 225. In some examples, buffer 240 may be configured to facilitate data transfer to non-volatile memory 225 via bus 295. In some examples, non-volatile memory 225 may be configured to facilitate data transfer to and from virtual memory bank 235 via bus 290.

Interface controller 230 may support low latency or reduced power operation (e.g., from the perspective of SoC/processor 250) by leveraging virtual memory bank 235 or buffer 240. For example, upon receiving a read command from SoC/processor 250, interface controller 230 may attempt to retrieve data from virtual memory bank 235 or buffer 240 for transmission to SoC/processor 250. If data subject to the read command is not present in virtual memory bank 235 or buffer 240, interface controller 230 may retrieve data from non-volatile memory 225 to store the data in virtual memory bank 235 and also (e.g., concurrently) send the data to SoC/processor 250.

Retrieving data from non-volatile memory 225 may be associated with increased latency compared to retrieving data from virtual memory bank 235 or buffer 240. In some examples, interface controller 230 may employ prefetching to proactively move data from non-volatile memory 225 to virtual memory bank 235. In this way, the memory access throughput of device 210 may be increased as the processor may access data stored in virtual memory bank directly, according to a DRAM memory access protocol.

Interface controller 230 may further reduce power consumption and latency by prefetching portions of a memory page. For example, interface controller 230 may receive a request for data from SoC/processor 250 that is located in a memory page of non-volatile memory 225. In some cases, the requested data may not be located in virtual memory bank 235 or buffer 240. Interface controller 230, or in some cases a local memory controller included in non-volatile memory array 225, may identify the memory page of non-volatile memory 225, and the portion, or subpage(s), of the memory page that includes the requested data. Non-volatile memory 225 may transmit the subpage including the requested data to virtual memory bank 235. In some cases, interface controller 230, or in some cases a local memory controller included in non-volatile memory array 225, may also identify a value of a prefetch counter associated with the memory page that includes the requested data, and non-volatile memory 225 may transmit additional subpages of the memory page with the subpage(s) that include the requested data based on the value of the prefetch counter. For example, for one value of the prefetch counter (e.g., logic 01), non-volatile memory 225 may transmit at least one additional subpage with the subpage(s) that include the requested data.

Interface controller 230 may manage operations of virtual memory bank 235. For example, interface controller 230 may use a set of flags located in virtual memory bank 235 to identify portions of virtual memory bank 235 storing valid data from non-volatile memory 225. As another example, upon receiving a write command from SoC/processor 250, interface controller 230 may store data at virtual memory bank 235. Another set of flags located in virtual memory bank 235 may indicate which portions of virtual memory bank 235 store valid data that are modified from corresponding contents of non-volatile memory 225. Valid data stored at virtual memory bank 235 may include data that have been retrieved from non-volatile memory 225 pursuant to a read command from SoC/processor 250 or data that have been received from SoC/processor 250 as a part of write command. Flags indicating which portions of virtual memory bank 235 store valid data or modified data may support interface controller 230 in saving only the data that has been modified from the corresponding contents in non-volatile memory 225. Furthermore, interface controller 230 may determine where to store data upon removal from virtual memory bank 235 (e.g., when SoC/processor 250 no longer needs the data). Interface controller 230 may monitor and identify the contents of virtual memory bank 235.

In some cases, interface controller 230 may include a counter that records a number (e.g., quantity or frequency) of access attempts by SoC/processor 250 to the contents of virtual memory bank 235 during a certain time interval. By way of example, if the counter shows that the number of access attempts by SoC/processor 250 during the time interval is less than a pre-determined threshold value, then upon removal of the data from virtual memory bank 235, interface controller 230 may store modified data (that is, data that was modified by the access attempts by SoC/processor 250) in non-volatile memory 225, as the interface controller 230 may anticipate, based on the relatively low number of prior access attempts, that SoC/processor 250 is not likely to access the data again for some duration of time. Or, if the counter indicates that the number of access attempts by SoC/processor 250 during the time interval is equal to or larger than the pre-determined threshold value, then interface controller 230 may, upon removal of the data from virtual memory bank 235, store the data in buffer 240, as the interface controller 230 may anticipate that SoC/processor 250 is likely to access the data soon. One skilled in the art may, in view of overall system requirements, devise various criteria (e.g., criteria including the threshold value of the counter, a clock, a value of the time interval, etc.) for interface controller 230 to use in making such determinations.

In some examples, interface controller 230 may record a number of access attempts by SoC/processor 250 of certain portions or subpages of a memory page stored at virtual memory bank. In some examples a portion of a memory page may include one or more subpages of the memory page. Interface controller 230 may transmit the portions to the buffer based on the recorded number of access attempts for the individual portions. For example, interface controller 230 may transmit portions to buffer 240 that have been accessed at least a threshold number of times, and may discard or write-back to non-volatile memory 225 portions that have not been accessed the threshold number of times. A value of a prefetch counter for a memory page may be based on the portion of the memory page that is transmitted to buffer 240—e.g., may be based on a relationship between the portions sent to virtual memory bank 235 and the portion(s) of the memory page sent to buffer 240.

In addition, interface controller 230 may set up a by-pass indicator based on the counter when the number of access attempts by SoC/processor 250 is less than the pre-determined threshold value to by-pass saving the contents of virtual memory bank 235 to buffer 240. Then, interface controller 230 may directly save the modified contents of virtual memory bank 235 to non-volatile memory 225 based on the by-pass indicator. In some cases, upon removal of the data from virtual memory bank 235, interface controller 230 may determine that the data has not been modified since it was last retrieved from non-volatile memory 225 and may, based on that determination, discard the data (e.g., not write the data to either buffer 240 or non-volatile memory 225).

In some examples, a memory array in non-volatile memory 225 may be configured to store data in a first memory page configured with a first memory page size (e.g., 64, 128, 192, or 256 bytes). In some cases, the first memory page may be partitioned into a number of subpages. In some examples, the memory array may be configured with multiple memory pages that each share a common page size. For example, a 32 Gbyte memory array may include 500 million pages, each page having a page size of 64 bytes.

Virtual memory bank 235 may be configured to store data in a second memory page configured with a second memory page size (e.g., 2056 bytes) different from the first memory page size. In some examples, memory sub-system 220 may also include a prefetch counter associated with the first memory page. The prefetch counter may be configured to store a first value that corresponds to a first portion of the first memory page provided to the memory bank in response to a request for data located in the first memory page. In some cases, a prefetch counter may be included interface controller 230, or in some cases a local memory controller included in non-volatile memory array 225, or both. In some cases, a controller may include multiple prefetch counters. For example, a controller may include a prefetch counter for each memory page, for each memory subpage in the memory array, or some combination.

Buffer 240 may be configured to receive data corresponding to a second portion of the first memory page. In some cases, a value of the prefetch counter may be based on the second portion of the first memory page—e.g., based on a relationship between the first portion and the second portion of the first memory page. In some cases, interface controller 230, or in some cases a local memory controller included in non-volatile memory array 225, may be configured to modify the value of the prefetch counter based on the relationship between the first portion and the second portion of the first memory page. Memory sub-system 220 may also include a second counter configured to monitor a number of access operations performed on all or a subpages of the first portion of the first memory page. In some cases, the data represented in the second portion of the first memory page transmitted to buffer 240 may be based on the monitored number of access operations. In some cases, the second counter may be included in interface controller 230, or in some cases a local memory controller included in non-volatile memory array 225.

In some cases, memory sub-system 220 may include means, such as interface controller 230, for receiving a first request for first data located in a memory page of non-volatile memory 225. Memory sub-system 220 may include means, such as interface controller 230, or in some cases a local memory controller included in non-volatile memory array 225, for identifying a first value of a prefetch counter associated with the memory page of the memory array. Memory sub-system 220 may include means, such as interface controller 230, or in some cases a local memory controller included in non-volatile memory array 225, for communicating, from the memory array to virtual memory bank 235, a first portion of the memory page based at least in part on the first value of the prefetch counter, the first portion of the memory page including the first data. Memory sub-system 220 may also include means, such as interface controller 230, for writing the first portion of the memory page to virtual memory bank 235.

Additionally, memory sub-system 220 may include means, such as interface controller 230, for communicating, to buffer 240, a second portion of the memory page, the second portion comprising at least a subset of the first data. Memory sub-system 220 may also include means, such as interface controller 230, or in some cases a local memory controller included in non-volatile memory array 225, for modifying the first value of the prefetch counter based at least in part on a relationship between the first portion of the memory page and the second portion of the memory page. Memory sub-system 220 may include means, such as interface controller 230, or in some cases a local memory controller included in non-volatile memory array 225, for determining that the second portion of the memory page is different from the first portion of the memory page. And the means for modifying the first value of the prefetch counter may modify or adjust the first value of the prefetch counter based on determining that the second portion of the memory page is different from the first portion of the memory page.

Memory sub-system 220 may also include means, such as buffer 240, for evicting the second portion of the memory page, wherein modifying the first value of the prefetch counter is based at least in part on evicting the second portion of the memory page. Memory sub-system 220 may also include means, such as interface controller 230, for monitoring a number of access operations performed on the first portion of the memory page, where a second value of the prefetch counter is determined based at least in part on the number of access operations. In some examples, the means for monitoring the number of access operation monitors the number of access operations performed on one or more subsets, or subpages, of the first portion of the memory page.

Memory sub-system 220 may also include means, such as interface controller 230, for determining that a first number of access operations performed on a subset of the one or more subsets satisfies a threshold. And the means for communicating data to buffer 240 may communicate at least the subset to buffer 240 based at least in part on the determining. In some examples, the means for receiving the first request for first data further receives a second request for second data located in the memory page of non-volatile memory 225. Additionally, the means for communicating from non-volatile memory 225 to virtual memory bank 235 may also communicate a second portion of the memory page, wherein the first portion of the memory page is different from the second portion of the memory page, and wherein the second portion of the memory page comprises the second data. Moreover, the means for communicating from virtual memory bank 235 to buffer 240 may also communicate, from virtual memory bank 235 to buffer 240, a third portion of the memory page. The means for modifying a value of the prefetch counter may further modify the first value of the prefetch counter based on a relationship between the first portion of the memory page, the second portion of the memory page, or the third portion of the memory page, or any combination thereof.

The means for identifying a value of the prefetch counter may further identify a second value of the prefetch counter associated with the memory page, the second value being different from the first value. And the means for communicating from non-volatile memory 225 to virtual memory bank 235 may communicate a second portion of the memory page based at least in part on the second value of the prefetch counter, where the first portion of the memory page is different from the second portion of the memory page, and where the second portion of the memory page comprises the second data.

Figure 3:
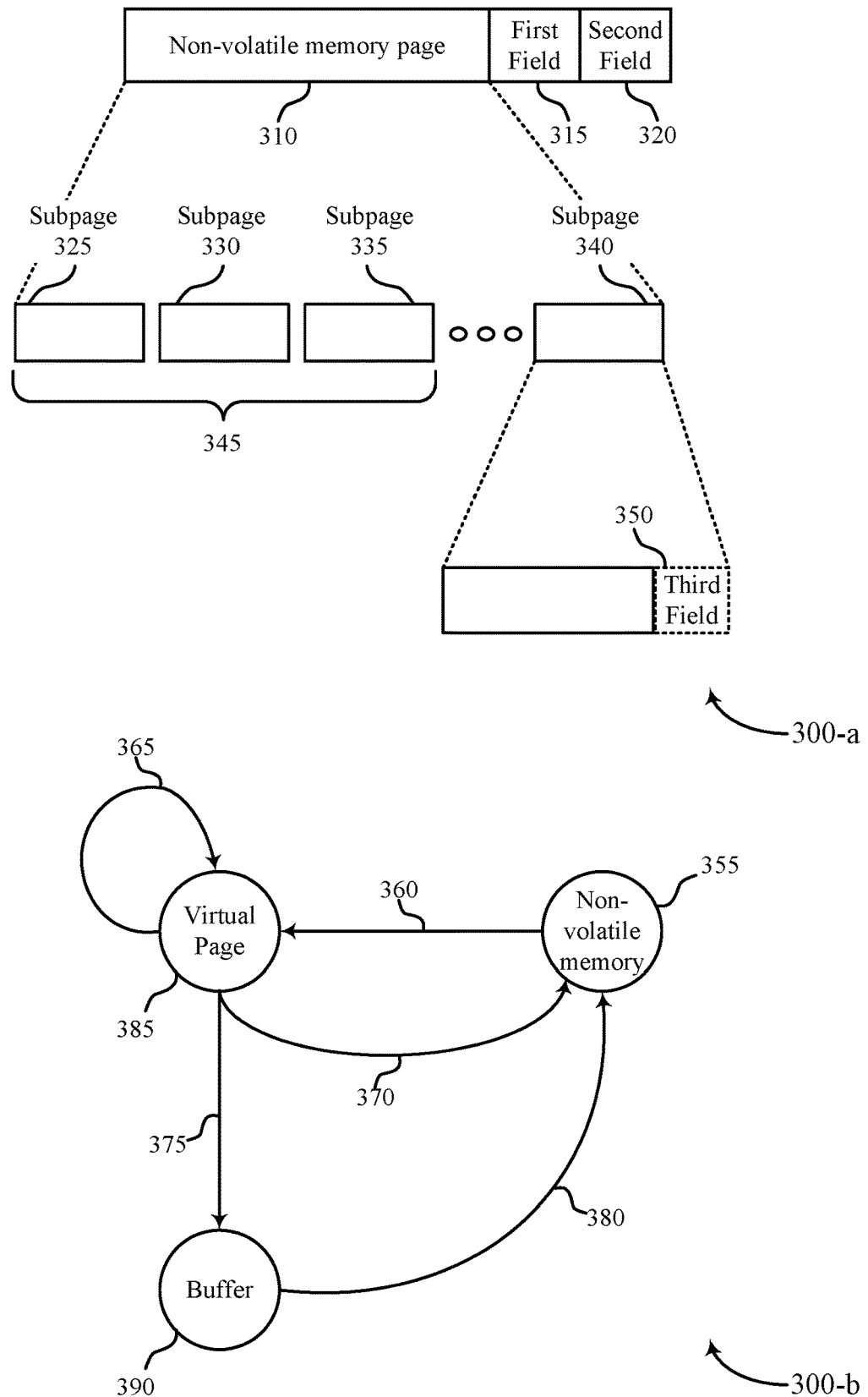
FIG. 3 illustrates an exemplary data structure and state diagram that support prefetch management for main memory in accordance with examples of the present disclosure.

FIG. 3 illustrates an exemplary data structure 300-*a* and state diagram 300-*b* that support prefetch management for main memory in accordance with examples of the present disclosure. Data structure 300-*a* illustrates a non-volatile memory page 310, a first field 315, and a second field 320.

Non-volatile memory page 310 may be used to store an amount of data. For instance, the non-volatile memory page 310 may be 128 or 256 bytes. Non-volatile memory page 310 may include a number of subpages, such as subpage 325, subpage 330, subpage 335, and subpage 340. Each subpage may be 64 bytes. In some examples, the subpages may be grouped as portions, such as portion 345.

Non-volatile memory page 310 may be associated with first field 315 and second field 320. In some examples, the first field 315 may be configured to indicate (and may be updated to track) a number of times a corresponding non-volatile memory page 310 has been accessed (e.g., read or write) by an SoC/processor (e.g., SoC/processor 250 described with reference to FIG. 2). In some examples, the first field 315 may be referred to as a saturating counter (SC). The first field 315 may in some cases include two bits of information, but it is to be understood that any number of bits may be used in accordance with the teachings herein. In some examples, non-volatile memory page 310 may be included in an FeRAM array.

In some examples, the second field 320 may be configured to indicate a size of data in a corresponding non-volatile memory page 310 to be retrieved upon receiving a read command. The size of data may be determined by an access pattern to the data made by an SoC/processor in one or more previous access operations and referred to as a prefetch size in some cases. A prefetch size may be an amount of data that is to be read in response to a read command for data included in the non-volatile memory page 310. For example, if data from the non-volatile memory page 310 is subject to a read command received by an interface controller 230, or in some cases a local memory controller included in non-volatile memory array 225 as described in FIG. 2, (e.g., in anticipation of an access from an SoC/processor), the interface controller 230, or in some cases the local memory controller, may identify the subpage that includes the requested data and a value of the associated second field 320 to determine a prefetch size. The prefetch size may indicate a size of data (that includes and thus is at least as large as the requested data) to be read from the non-volatile memory 225 in response to the read request.

In some examples, logic states stored in the second field 320 may indicate a prefetch size of the corresponding non-volatile memory page 310. For example, "00" may correspond to 64 bytes, "01" may correspond to 128 bytes, "10" may correspond to 192 bytes, and "11" may correspond to 256 bytes. In such an example, if the interface controller 230, or in some cases a local memory controller included in non-volatile memory array 225, receives a read command for 64 bytes of data from a non-volatile memory page 310, and the associated second field 320 is 01, then the interface controller 230, or in some cases a local memory controller included in non-volatile memory array 225, may identify the prefetch size for the requested data as 192 bytes and read from the non-volatile memory 225 192 bytes of data, where the 192 bytes includes the requested 64 bytes. For example, the interface controller 230, or in some cases a local memory controller included in non-volatile memory array 225, may identify that the requested data is located in subpage 330 and may read portion 345. It is to be understood that the second field 320 may include any number of bits supporting any number of logic states and may indicate prefetch sizes of any size. In some examples, the second field 320 may be referred to as a prefetch (PF) counter.

In some examples, a subpage, such as subpage 340, may include a third field 350, which may be used to indicate (and may be updated to track) a number of times subpage 340 has been accessed. In some examples, the third field 350 may be referred to as a saturating counter (SC). The third field 350 may include two bits of information, but it is to be understood that any number of bits may be used in accordance with the present disclosure.

In some examples, an interface controller (e.g., interface controller 230 described with reference to FIG. 2, not shown in FIG. 3) may use a set of mode register bits to facilitate the SC and PF counter functionality of a non-volatile memory (e.g., non-volatile memory 225 described with reference to FIG. 2). In some examples, mode registers may establish various operation modes (e.g., different test modes, different read or write modes, different performance modes) of a memory device and a set of bits associated with mode registers, which may be referred to as mode register bits, may be used to determine a particular mode of operation.

In some examples, an interface controller may access the contents of the SC and PF counter using a data mask inversion (DMI) pin along with data during a read operation. In some examples, an interface controller may write the contents of the SC and PF counter with a special command sequence. For example, an interface controller may provide the contents of SC and PF counter to registers associated with the SC and PF counter via column address pins during a write command issued to a non-volatile memory (e.g., non-volatile memory 225 described with reference to FIG. 2).

State diagram 300-*b* illustrates exemplary operational characteristics of a memory system or sub-system that support features and techniques as described herein. State diagram 300-*b* illustrates non-volatile memory 355, virtual page 385, and buffer 390. Non-volatile memory 355 may be an example of non-volatile memory 225 described with reference to FIG. 2. In some examples, non-volatile memory 355 includes non-volatile memory page 310.

Virtual page 385 may be a page within virtual memory bank 235 described with reference to FIG. 2. In some examples, virtual memory bank 235 may be a superset of multiple virtual pages 385. Buffer 390 may be an example of buffer 240 described with reference to FIG. 2. An interface controller (e.g., interface controller 230 described with reference to FIG. 2, not shown in FIG. 3) may perform or manage various operations (e.g., operations 360 through 380) associated with non-volatile memory 355, virtual page 385, and buffer 390. In some cases, an interface controller may manage an operation by requesting another entity (e.g., a local memory controller included in non-volatile memory array 225 described with reference to FIG. 2) to perform the operation.

Operation 360 may include transmitting the contents of a non-volatile memory page 310 from non-volatile memory 355 to virtual page 385 and storing the contents in virtual page 385. Operation 360 may be carried out by the interface controller in conjunction with a local memory controller (e.g., a local memory controller included in non-volatile memory array 225 as described with reference to FIG. 2) when an SoC/processor requests data corresponding to the contents of non-volatile memory page 310 that is not present either in the virtual page 385 or the buffer 390. Additionally, the interface controller may as part of operation 360 update a value of the first field 315 (e.g., a value of SC) associated with the non-volatile memory page 310, to track a number of access events by the SoC/processor for the non-volatile memory page 310.

In some examples, operation 360 may include transmitting the contents of a non-volatile memory page 310 from non-volatile memory 355 to virtual page 385 based on or in response to receiving a request for certain data. In other examples, operation 360 may include transmitting the contents of a non-volatile memory page 310 from non-volatile memory 355 to virtual page 385 before receiving a request for certain data (e.g., during a prefetch operation). In some cases, operation 360 may include transmitting a portion of a non-volatile memory page 310 stored in non-volatile memory 355 to virtual page 385 before receiving a request for certain data or after receiving a request for certain data located in a subpage of non-volatile memory page 310 (e.g., during a partial prefetch operation).

For example, an interface controller 230, or in some cases a local memory controller included in non-volatile memory array 225, may receive a request for data located in subpage 335. The interface controller 230, or in some cases a local memory controller included in non-volatile memory array 225, may identify a value of the second field 320 based on receiving the request and may transmit a portion of non-volatile memory page 310 based on the value of the second field 320. For example, the interface controller 230, or in some cases a local memory controller included in non-volatile memory array 225, may determine that the value of the second field is logic 10, and may transmit portion 345, having a size of 192 bytes to virtual page 385. Additionally, the interface controller may as part of operation 360 update a value of a third field, such as third field 350, (e.g., a value of a respective SC) associated with the subpages 325, 330, and 335, to track a number of access events by the SoC/processor for the subpages 325, 330, and 335.

The interface controller may perform operation 365 when data requested by an SoC/processor (e.g., subject to a read command sent to the interface controller by the SoC/processor) is found in virtual page 385. As part of operation 365, the interface controller may retrieve the requested data from the virtual page 385 and provide the requested data to the SoC/processor without accessing either non-volatile memory 355 or buffer 390. In some examples, providing the requested data includes transmitting or accessing data corresponding to a full non-volatile memory page Additionally, the interface controller may update a value of the first field 315 (e.g., a value of SC) associated with the data, to track a number of access events by the SoC/processor for the non-volatile memory page 310.

In some examples, providing the requested data includes transmitting or accessing data corresponding to a portion of a non-volatile memory page. Additionally, the interface controller may update a value of a third field, such as third field 350, (e.g., a value of a respective SC) associated with the data, to track a number of access events by the SoC/processor for a subpage of non-volatile memory page 310.

The interface controller may perform operation 370 when a page in virtual page 385 is closed and a value of the first field 315 (e.g., a value of SC) associated with the closed page does not satisfy a threshold value. Virtual page 385 may include one or more pages within virtual memory bank 235 described with reference to FIG. 2. The interface controller may determine to close a page in virtual page 385 when the SoC/processor no longer needs the data associated with the page. Upon determining to close a page in virtual page 385, the interface controller may remove the data to make the memory space corresponding to the page available for the SoC/processor. Similarly, the interface controller may perform operation 370 when a subpage in virtual page 385 is closed and a value of a respective third field, such as third field 350 (e.g., a value of SC), associated with the closed page does not satisfy a threshold value.

In some cases, the interface controller may use a threshold value to determine how to dispose data from a closed page of virtual page 385. In some examples, when a value corresponding to first field 315 (e.g., a value of SC) is less than the threshold value, the interface controller may bypass saving data from a closed page to buffer 390. Instead, the interface controller may store any modified data from the closed page in non-volatile memory 355 and discard any unmodified data from the closed page. In such cases, the interface controller may determine whether data from a closed page includes a portion that the SoC/processor has modified relative to corresponding data stored in non-volatile memory 355. During operation 370, the interface controller may store any modified portion of the data of the closed page in non-volatile memory 355 from virtual page 385. Further, the interface controller may discard any unmodified data from a closed page after determining that the data has not been modified (that is, the interface controller may bypass storing an unmodified portion of the data in non-volatile memory 355). The interface controller may, in view of overall system requirements, determine the threshold value based on various criteria (e.g., a pre-determined value associated with a number of access to the page, a value of a time interval associated with lack of access to the page).

The interface controller may perform operation 375 when the interface controller determines to close a page in virtual page 385 and determines that a value of the first field 315 (e.g., a value of SC) associated with the closed page satisfies the threshold value described above. In some examples, when a value of the first field 315 (e.g., a value of SC) is equal to or greater than the threshold value, the interface controller may save data from a closed page to buffer 390, as the interface controller may determine that the SoC/processor is likely to access the data soon. As such, as a part of operation 375, the interface controller may store data from the closed page in buffer 390. Similarly, the interface controller may determine that a value of a third field (e.g., a value of SC) associated with a subpage of the closed page satisfies the threshold value described above. In some examples, when a respective value of the third field 350 (e.g., a value of SC) is equal to or greater than the threshold value, the interface controller may save data from a second portion of non-volatile memory page 310—e.g., the subpages of a closed page having a value of a third field that is equal to or greater than the threshold value—to buffer 390, as the interface controller may determine that the SoC/processor is likely to access those subpages soon. For example, the interface controller may save subpage 325 and subpage 335 to buffer 390.

The interface controller may perform operation 380 when it evicts a page from buffer 390. The interface controller may determine to evict a page from buffer 390 when the page is not accessed by the SoC/processor for a predetermined duration. In some cases, data from an evicted page may include a portion that has been modified by the SoC/processor relative to corresponding data stored in non-volatile memory 355. In such cases, as a part of operation 380, the interface controller may store only a modified portion of the evicted data in non-volatile memory 355. Additionally, as part of operation 380, the interface controller may update (e.g., reset to zero) a value of the first field 315 (e.g., a value of the SC) associated with the evicted page. Further, the interface controller may discard data after determining that the data has not been modified (that is, the interface controller may bypass storing an unmodified portion of the evicted data in non-volatile memory 355). Similarly, the interface controller may update (e.g., reset to zero) a value of a respective third field, such as third field 350, associated with an evicted subpage.

Additionally, as part of operation 380, the interface controller may update a value of the second field 320. For example, interface controller may decrease the value of the second field if a second portion of non-volatile memory page 310 stored to buffer 390 is smaller in size than the first portion of non-volatile memory page 310 transmitted to virtual page 385.

Figure 4A:
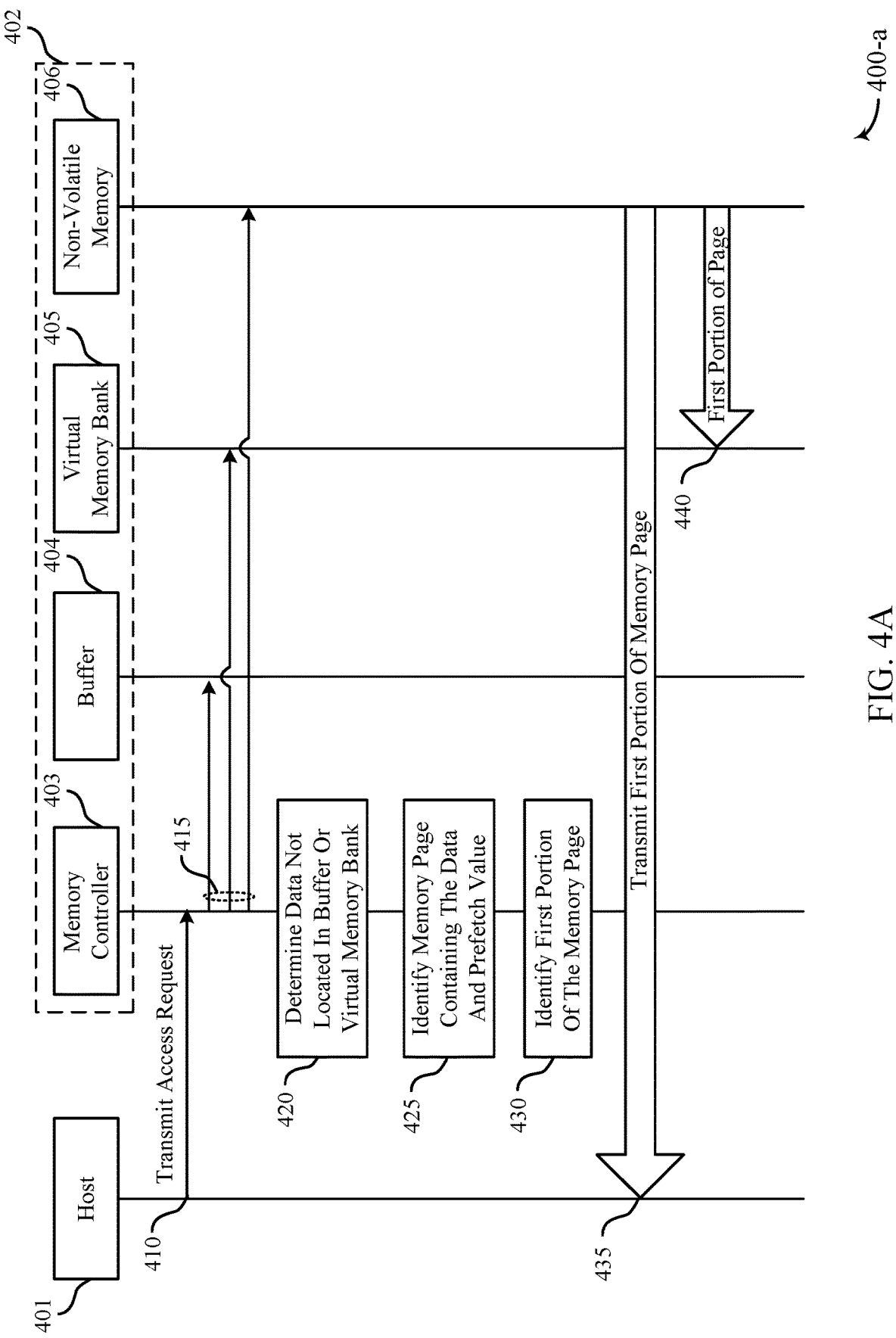
FIGS. 4A and 4B illustrate exemplary process flows for a prefetch operation in accordance with examples of the present disclosure.

FIG. 4A illustrates an exemplary process flow 400-a for a prefetch operation in accordance with examples of the present disclosure. Process flow 400-a depict aspects of a prefetch operation involving host 401, which may be an example of an SoC/processor as discussed with reference to FIG. 2, and memory sub-system 402 which may be an example of a memory sub-system as discussed with reference to FIG. 2. Memory sub-system 402 may include memory controller 403, which may be an example of an interface controller 230 or a local memory controller included in non-volatile memory array 225, or a combination thereof, as discussed with reference to FIG. 2; buffer 404, which may be an example of a buffer as discussed with reference to FIGS. 2 and 3; virtual memory bank 405, which may be an example of a virtual memory bank or virtual page as discussed with reference to FIGS. 2 and 3; and non-volatile memory 406, which may be an example of a non-volatile memory as discussed with reference to FIGS. 2 and 3. Memory controller 403, buffer 404, virtual memory bank 405, and non-volatile memory 406 may communicate with one another over one or more data busses.

At 410, host 401 may transmit an access request for data (e.g., to read or write data) stored in memory sub-system 402. In some cases, the access request may be transmitted according to a certain memory access protocol (e.g., a DRAM memory access protocol). In some examples, the access request may be sent directly to one or more components of memory sub-system 402. For example, the access request may be transmitted directly to buffer 404 and/or virtual memory bank 405, which may both operate according to the certain memory access protocol used by host 401. In some examples, the access request may be a request to read 64 bytes of data stored in memory sub-system 402. In other examples, the access request may be a request to read 128 bytes of data stored in memory sub-system 402, and so on. Additionally or alternatively, the access request may be sent indirectly to components of memory sub-system 402 via memory controller 403. For example, the access request may be sent to memory controller 403 which may relay the access request to buffer.

At 415, memory controller 403 may access the requested data based on receiving the access request from host 401. Memory controller may forward the access request received from host 401 to one or more of buffer 404, virtual memory bank 405, and non-volatile memory 406. In some cases, memory controller may forward the access request to buffer 404, then to virtual memory bank 405, and last to non-volatile memory 406—e.g., after determining the requested data is not in buffer 404 or virtual memory bank 405. In some cases, memory controller 403 may forward the access request only to non-volatile memory 406—e.g., after determining the requested data is not in buffer 404 or virtual memory bank 405. In some examples, non-volatile memory 406 may include an FeRAM memory array.

At 420, buffer 404, memory controller 403 may determine that the requested data is not located in buffer 404 or virtual memory bank 405.

At 425, memory controller 403 may identify the non-volatile memory page (e.g., non-volatile memory page 310 of FIG. 3) located in non-volatile memory 406 that contains the requested data. The non-volatile memory page may be partitioned into multiple subpages. In some examples, memory controller 403 may also identify a subpage (e.g., subpage 330 of FIG. 3) of the non-volatile memory page that contains the requested data. In some cases, the subpage that contains the requested data may be 64 bytes. In other examples, the size of the requested data may be 128 bytes, and two subpages may contain the requested data.

Additionally, memory controller 403 may identify a value of a prefetch counter (e.g., second field 320 of FIG. 3) associated with the non-volatile memory page. In some cases, the prefetch counter may be initialized with a value of logic 00. In other cases, the prefetch counter may be initialized with a value of logic 11. Initializing a value of the prefetch counter with logic 11 may cause non-volatile memory 406 to initially transmit more data (e.g., at power-on), increasing power consumption and throughput. Conversely, a value of the prefetch counter with logic 00 may cause non-volatile memory 406 to initially transmit less data, decreasing power and potentially lowering throughput. In some examples, the selected initialization value corresponds to a power mode (e.g., high low power mode) or operation mode (e.g., high throughput mode) of the device.

At 430, memory controller 403 may identify a first portion (e.g., portion 345 of FIG. 3.) of the non-volatile memory page containing the requested data based on the value of the prefetch counter. The first portion may include at least the subpage that contains the requested data. In some examples, a size of the first portion may be based on the value of the prefetch counter. For example, if the value of the prefetch counter equals logic 00, then a size of the first portion may be equal to 64 bytes (e.g., the first portion may only include the subpage containing the data). In another example, if the value of the prefetch counter equals logic 01, then a size of the first portion may be equal to 128 bytes (e.g., the first portion may include the subpage containing the requested data as well as a second subpage). In another example, if the value of the prefetch counter equals logic 10, then a size of the first portion may be equal to 192 bytes (e.g., the first portion may include the subpage containing the requested data, a second subpage, and third subpage), and so on.

In some examples, the size of the requested data may override the prefetch counter value. For example, if the size of the requested data is 128 bytes, and the prefetch counter value corresponds to size of 64 bytes, then a size of the first portion may be equal to 128 bytes (e.g., the first portion may include the two subpages containing the requested data). Other mappings between a value of a prefetch counter and the size of the first portion may be alternatively used and are contemplated based on the present disclosure. For instance, a prefetch value of logic 00 may correspond to 128 bytes, a prefetch value of logic 01 may correspond to 256 bytes, a prefetch value of logic 10 may correspond to 384 bytes, and so on.

In some examples, memory controller 403 may select which subpages to include with the subpage containing the requested data based on one or more factors or indicators (e.g., historical access operations performed on the subpages in the non-volatile memory page). For example, memory controller 403 may identify that subpages of a memory page, other than a subpage of the memory page containing the requested data, were previously accessed in virtual memory bank 405, and may transmit the identified subpages with the subpage containing the requested data in subsequent read operations. In this way, memory controller 403 may anticipate subsequent data requests from host 401 and avoid delays associated with accessing non-volatile memory 406.

For instance, memory controller 403 may monitor the data stored in virtual memory bank 405 and identify which subpages correspond to data accessed in virtual memory bank 405. In some cases, memory controller 403 may identify that data corresponding to a subpage has been accessed more than a threshold number of time (e.g., more than once) if the data may be moved to buffer 404, and may transmit, in a subsequent access request for data in the non-volatile memory page, the identified subpages with the subpage containing the data requested in the subsequent access request. In some examples, memory controller 403 may track a number of access operations performed on data corresponding to each subpage of the non-volatile memory page and may transmit the subpage with the most access attempts within a certain period of time with the subpage containing the requested data. A respective saturation counter may be used to track a number of access operations performed on each subpage of a non-volatile memory page.

Additionally, memory controller 403 may keep track of when access operations are performed on subpages of the non-volatile memory page. For example, memory controller 403 may choose to include the most recently accessed subpages in subsequent transmissions of data from the non-volatile memory page. Additionally, memory controller 403 may identify that two subpages are often accessed together, set the prefetch value to logic 01, and transmit the two subpages together when data in one of the subpages is accessed.

At 435, memory sub-system 402 may transmit, or memory controller 403 may cause non-volatile memory 406 to transmit, data corresponding to the first portion of the non-volatile memory page to host 401. Accordingly, virtual memory bank 405 may store data corresponding to the first portion of the non-volatile memory page. In some examples, storing data corresponding to the first portion of the non-volatile memory page includes storing data corresponding to respective saturation counters for each of the subpages.

At 440, memory sub-system 402 may transmit, or memory controller 403 may cause non-volatile memory 406 to transmit, data corresponding to the first portion of the non-volatile memory page to virtual memory bank 405.

In some examples, 410, 415, and 420 may be omitted from process flow 400-*a*. For example, memory controller 403 may preemptively move non-volatile memory page and/or non-volatile memory sub-pages to virtual memory bank 405. In some cases, memory controller 403 may move a portion of a non-volatile memory page to virtual memory bank 405 based on a value of a prefetch counter. That is, memory controller 403 may identify a subpage of a non-volatile memory page to be moved to virtual memory bank and may move additional subpages of the non-volatile memory page to virtual memory bank based on a value of a prefetch counter associated with the non-volatile memory page.

Figure 4B:
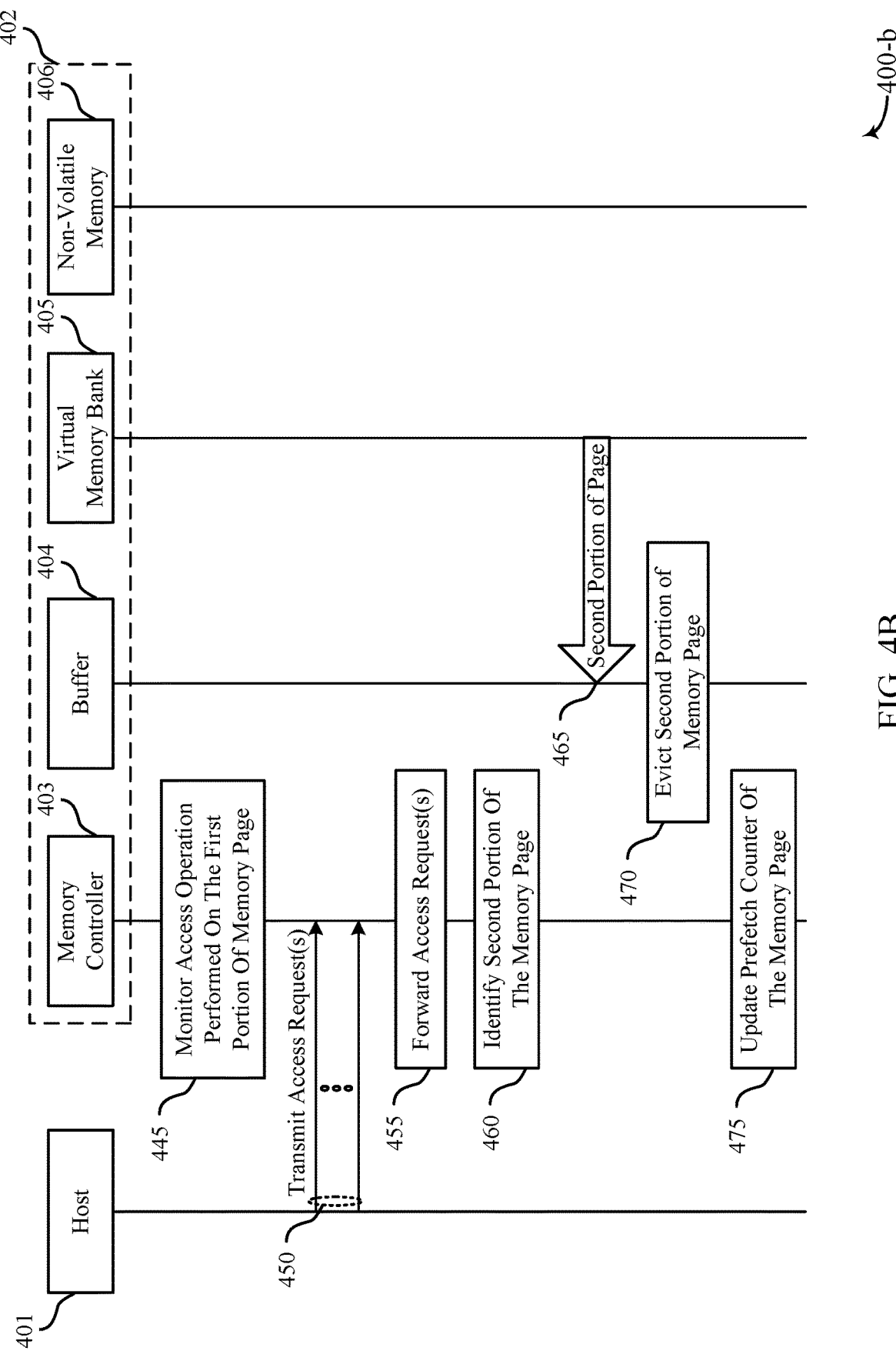

FIG. 4B illustrates an exemplary process flow 400-*b* for a prefetch operation in accordance with examples of the present disclosure. Process flow 400-*b* depict aspects of a prefetch operation involving host 401 and memory sub-system 402, which may include memory controller 403, buffer 404, virtual memory bank 405, and non-volatile memory 406. The operations performed in process flow 400-*b* may be a follow on to the operations performed in process flow 400-*a* as discussed with reference to FIG. 4A.

At 445, memory sub-system 402 may monitor access operations performed on the first portion of the non-volatile memory page. For example, memory sub-system 402 may track a respective number of access operations performed on each subpage of the first portion of the non-volatile memory page (e.g., using a respective saturation counter). Virtual memory bank 405 may also keep track of which data stored in the subpages is valid—e.g., which data stored in virtual memory bank 405 matches (e.g., has not been overwritten) the data stored in non-volatile memory 406.

At 450, host 401 may transmit a number of access requests for data stored in memory sub-system 402. As above, the access request may be transmitted according to a certain memory access protocol, and may be transmitted either directly or indirectly to the components of memory sub-system 402.

At 455, memory controller 403 may forward the access requests to one or more of buffer 404, virtual memory bank 405, or non-volatile memory 406. In some examples, an access request may request data that is not located at buffer 404 or at virtual memory bank 405 (which may be referred to as a "miss"). After a miss, memory controller 403 may inform host 401 of the miss and indicate that there will be a delay in communicating the requested data. Memory controller 403 may then access the non-volatile memory page and may transmit, or cause non-volatile memory 406, to transmit a portion or subpage of the non-volatile memory containing the requested data to virtual memory bank 405 and/or host 401.

At 460, memory sub-system 402 may identify a second portion of the non-volatile memory page. In some examples, data corresponding to the second portion of the non-volatile memory page may be equivalent to or overlap with the data corresponding to the first portion of the non-volatile memory page. In other examples, data corresponding to the second portion of the non-volatile memory page may be different than, or non-overlapping with, the data corresponding to the first portion of the non-volatile memory page.

For example, the first portion of the non-volatile memory page may include data corresponding to a first, second, and third subpage, while the second portion of the non-volatile memory page may include data corresponding to the first and third subpages. In some examples, memory sub-system 402 determines which data corresponding to which subpages to include in the second portion based on the monitored access operations. For example, memory sub-system 402 may select the first and third subpages for inclusion in the second portion based on determining that a respective number of access operations had been performed on each of the two subpages (e.g., more than a threshold value), and may exclude the second subpage from inclusion in the second portion based on determining that a respective number of access operations were performed on the second subpage (e.g., less than a threshold value). In some instances, the second subpage may contain the data originally requested by host 401 at step 410.

At 465, memory sub-system 402 may transmit data corresponding to the second portion of the non-volatile memory page to buffer 404. In some examples, memory sub-system 402 may transmit the data to buffer 404 after closing a virtual page that includes the first portion of the non-volatile memory page at virtual memory bank 405—e.g., when SoC/processor no longer needs access to the virtual page or when the virtual page has not been accessed for a certain period of time. Accordingly, buffer 404 may store the data corresponding to the second portion of the non-volatile memory page.

At 470, buffer 404 may evict the second portion of the non-volatile memory page. For example, buffer 404 may evict the data corresponding to the second portion of the non-volatile memory page after a certain time period of time has passed or after the data has not been access for a certain period of time. Buffer 404 may also write back data that has been modified to non-volatile memory 406. Additionally, a saturation counter associated with an evicted page or subpage may be reset.

At 475 memory sub-system 402 may update the prefetch counter associated with the non-volatile memory page identified at 425 of process flow 400-*a*. The update to the prefetch counter may be based on a relationship between the evicted data corresponding to the second portion of the memory page and the data corresponding to the first portion of the memory page. For example, memory sub-system 402 may determine that a size of the data corresponding to the second portion of the non-volatile memory page is smaller than a size of the data corresponding to the first portion of the non-volatile memory page, and may decrease the value of the prefetch counter. In some examples, memory sub-system 402 may determine that a size of the data corresponding to the second portion of the non-volatile memory page is larger than a size of the data corresponding to the first portion of the non-volatile memory page—e.g., when additional data in the memory page, but external to the first portion of the memory page, is requested by host 401—and may increase the value of the prefetch counter.

In some cases, memory sub-system 402 may select a value of the prefetch counter to correspond to the size of the second portion evicted from the buffer. For example, if a size of the evicted second portion is 256 bytes, then a value of the prefetch counter may be updated to logic 11. In other examples, memory sub-system 402 may determine that the subpages corresponding to the data written to buffer 404 are different than one or more of the subpages corresponding to the data written to virtual memory bank 405, and may modify a value of the prefetch counter. In some examples, memory sub-system 402 may update the prefetch counter prior to 475. For example, memory sub-system 402 may similarly update a value of the prefetch counter after 465.

After 475, process flow 400-*b* may return to 410 or 425 of process flow 400-*a*. In some examples, host 401 transmits a request for data located in the same non-volatile memory page as above. As previously discussed, it may be determined that the requested data is not located in buffer 404 or virtual memory bank 405, and memory sub-system 402 may identify the same non-volatile memory page as containing the requested data. Also as previously discussed, the memory sub-system 402 may identify a third portion of the memory page based on a value of the prefetch counter. In some examples, the identified third portion may be different than the first identified portion based on an updated value of the prefetch counter. For example, the first identified portion may correspond to the first, second, third subpages based on the first subpage containing the requested data and the prefetch counter having a value of logic 10. While the third portion may correspond to the first and third subpages, based on the first subpage containing the requested data and the prefetch counter having an update value of logic 01—e.g., based on memory sub-system identifying that the second subpage was moved to buffer 404, while the third subpage was not.

Figure 5:
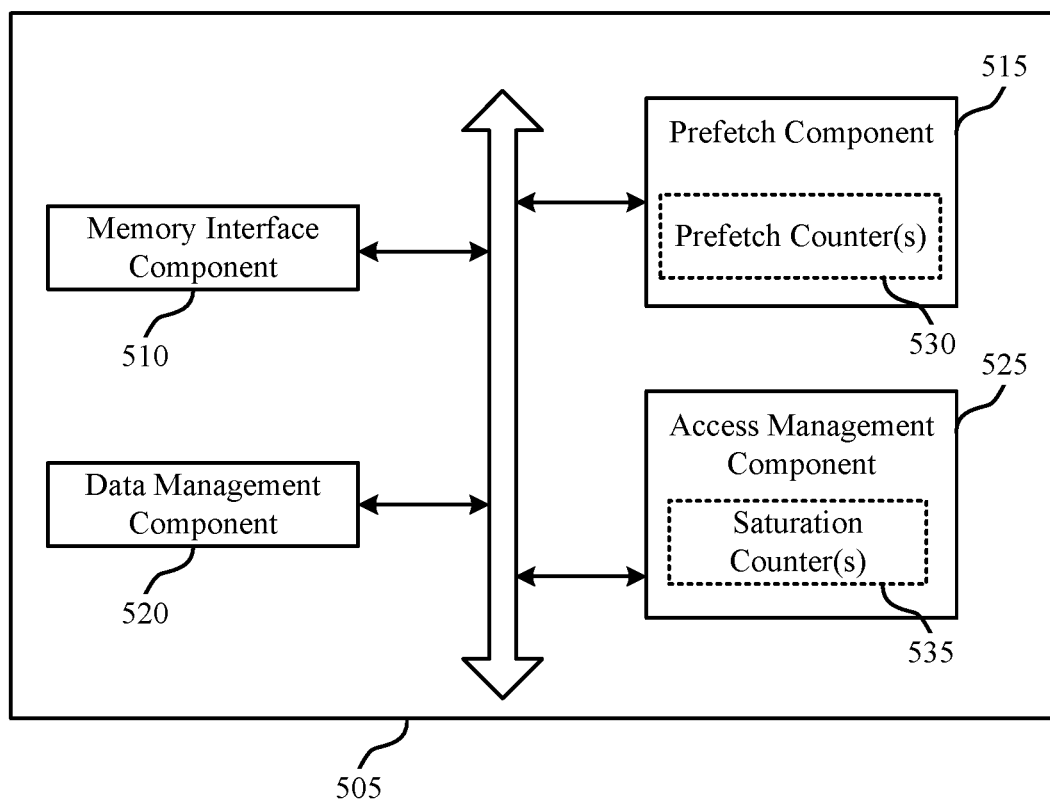
FIG. 5 shows a block diagram of a device that supports prefetch management for main memory in accordance with examples of the present disclosure.

FIG. 5 shows a block diagram 500 of a memory controller 505 that supports prefetch management for main memory in accordance with examples of the present disclosure. Memory controller 505 includes memory interface component 510, prefetch component 515, data management component 520, and access management component 525. Each of these components may communicate, directly or indirectly, with one another (e.g., via one or more buses). In some examples, memory controller 505 manages operations across a memory sub-system. That is, memory controller 505 may manage or facilitate communications between a memory array, a virtual memory bank, and a buffer. For instance, memory controller 505 may cause certain components of a memory sub-system to write or read data.

Memory interface component 510 may manage commands received from an external processor or SoC. For instance, memory interface component 510 may receive, from a processor, a request for data located in a memory page of a memory array that is coupled with memory interface component 510.

Prefetch component 515 may manage prefetch operations based on a received request for data located in the memory page of the memory array. For instance, prefetch component 515 may include a prefetch counter 530 and may identify a value of the prefetch counter 530 associated with the memory page containing the requested data.

Data management component 520 may communicate, from the memory array to a memory bank, a portion of the memory page based on the identified value of the prefetch counter 530, where the portion includes the requested data. In some examples, data management component 520 writes the portion of the memory page to the memory bank.

Access management component 525 may monitor a number of access operations performed on the portion of the memory page while stored at the memory bank. In some examples, access management component 525 tracks a number of times the memory page and/or portions of the memory page are accessed. In some instances, access management component 525 includes one or more counters 535 (e.g., saturation counters) to keep track of the number of access operations performed on the memory page. A second value of the prefetch counter 530 may be determined based on the monitored number of access operations. For example, access management component 525 may monitor the number of access operations performed on a subset, or subpage, of the portion of the memory page. Access management component 525 may determine that a number of access operations performed on a subpage satisfies a threshold—e.g., a value of a respective counter 535 is greater than a threshold value—and may communicate data corresponding to the subpage to a buffer based on the determination.

In some examples, data management component 520 may also communicate to a buffer another portion of the memory page. In some examples, the other portion includes the requested data. In some cases, prefetch component 515 modifies a value of the prefetch counter 530 based on a relationship between the first portion of the memory page and the second portion of the memory page. For example, prefetch component 515 may determine that the data represented by the second portion of the memory page is different than the data represented by the first portion of the memory page, and may modify, or adjust (e.g., increment/decrement) the value of the prefetch counter 530 based on determining that the portions are different.

Data management component 520 may also cause the buffer to evict the other portion of the memory page. In some cases, the prefetch component 515 modifies the value of the prefetch counter 530 based on the other portion being evicted from the buffer—e.g., in response to the eviction.

In some examples, memory interface component 510 may receive a second request for data located in the memory page of the memory array and may determine that the requested data is not located in the virtual memory bank or the buffer. Accordingly, data management component 520 may access the memory array and communicate a second portion including the second data of the memory page to the memory bank, where the first portion of the memory page (e.g., which may include subpage 1 and subpage 3) is different from the second portion of the memory page (e.g., which may include subpage 2), and where the second portion of the memory page comprises the second data.

Data management component 520 may later communicate data corresponding to a third portion of the memory page (e.g., which may include subpage 1, subpage 2, and subpage 3) to the buffer, and prefetch component 515 may modify the value of the prefetch counter 530 based on a relationship between the original, first portion of the memory page communicated to the memory bank, the second portion of the memory page communicated to the memory bank, and the third portion of the memory page communicated to the buffer. For example, prefetch component 515 may increment the value of the prefetch counter 530 based on determining that data corresponding to three subpages was evicted from the buffer, while two subpages were transmitted to the virtual memory bank.

After the prefetch counter 530 is updated, memory interface component may receive another request for data located in the memory page of the memory array. In some cases, the first and second data are the same, while in other cases the first and second data are different. Prefetch component 515 may identify a second value (e.g., the updated value) of the prefetch counter 530 associated with the memory page, and data management component 520 may communication, from the memory array to the memory bank another portion of the memory page based on the updated value of the prefetch counter 530. In some cases, the other portion includes the data requested in the latest request, the other portion is different than the original, first portion transmitted to the memory bank.

Figure 6:
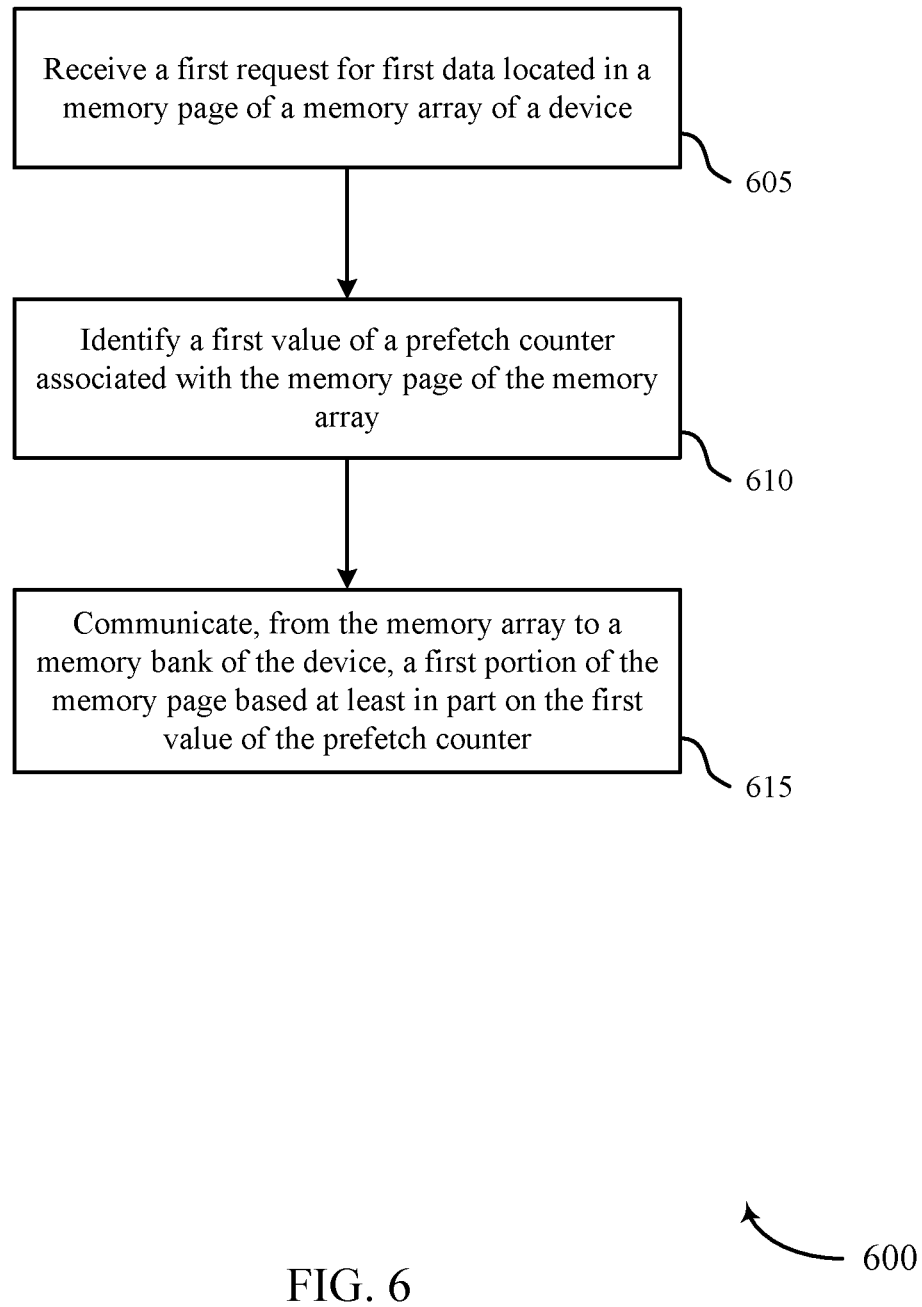
FIGS. 6 through 8 show flowcharts illustrating a method for prefetch management for main memory in accordance with examples of the present disclosure.

FIG. 6 shows a flowchart illustrating a method 600 for prefetch management for main memory in accordance with examples of the present disclosure. The operations of method 600 may be implemented by a memory system, sub-system, or its components as described herein. For example, the operations of method 600 may be performed by an memory controller, such as interface controller 230, as described with reference to FIG. 2, and may execute a set of codes to control the functional elements of the device to perform the functions below. Additionally or alternatively, a memory controller may perform aspects of the functions described below using special-purpose hardware.

At block 605, the memory controller may receive a first request for first data located in a memory page of a memory array of a device. The operations of block 605 may be performed according to the methods described with reference to FIGS. 3-4. In certain examples, some or all of the operations of block 605 may be performed by a memory interface component as described with reference to FIG. 5.

At block 610, the memory controller may identify a first value of a prefetch counter associated with the memory page of the memory array. The operations of block 610 may be performed according to the methods described with reference to FIGS. 3-4. In certain examples, some or all of the operations of block 610 may be performed by a prefetch component as described with reference to FIG. 5.

At block 615, the memory controller may communicate, from the memory array to a memory bank of the device, a first portion of the memory page based at least in part on the first value of the prefetch counter, the first portion of the memory page including the first data. The operations of block 615 may be performed according to the methods described with reference to FIGS. 3-4. In certain examples, some or all of the operations of block 615 may be performed by a data management component as described with reference to FIG. 5.

Figure 7:
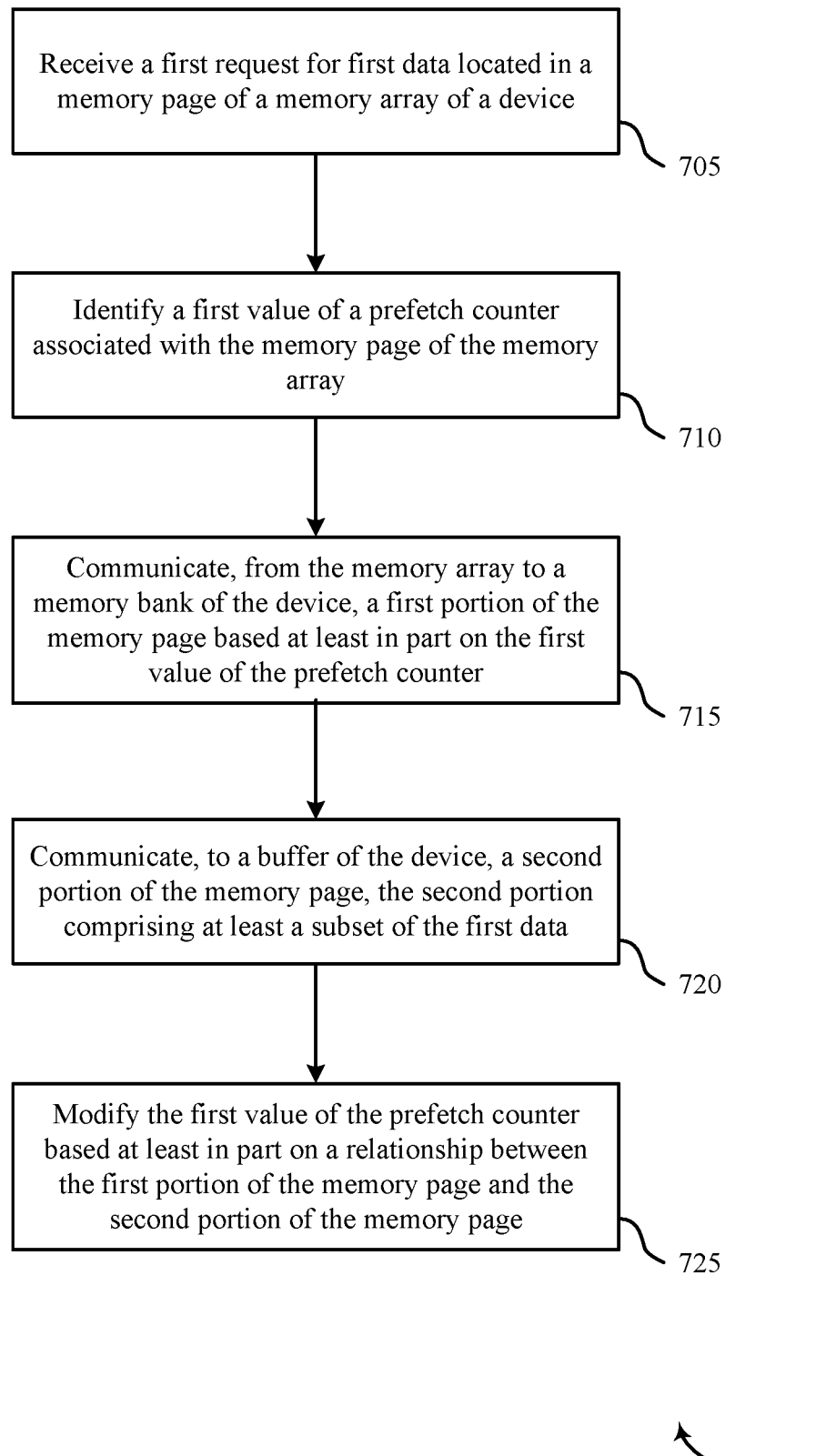

FIG. 7 shows a flowchart illustrating a method 700 for prefetch management for main memory in accordance with examples of the present disclosure. The operations of method 700 may be implemented by a memory system, sub-system, or its components as described herein. For example, the operations of method 700 may be performed by an memory controller, such as interface controller 230, as described with reference to FIG. 2, and may execute a set of codes to control the functional elements of the device to perform the functions below. Additionally or alternatively, a memory controller may perform aspects of the functions described below using special-purpose hardware.

At block 705, the memory controller may receive a first request for first data located in a memory page of a memory array of a device. The operations of block 705 may be performed according to the methods described with reference to FIGS. 3-4. In certain examples, some or all of the operations of block 705 may be performed by a memory interface component as described with reference to FIG. 5.

At block 710, the memory controller may identify a first value of a prefetch counter associated with the memory page of the memory array. The operations of block 710 may be performed according to the methods described with reference to FIGS. 3-4. In certain examples, some or all of the operations of block 710 may be performed by a prefetch component as described with reference to FIG. 5.

At block 715, the memory controller may communicate, from the memory array to a memory bank of the device, a first portion of the memory page based at least in part on the first value of the prefetch counter, the first portion of the memory page including the first data. The operations of block 715 may be performed according to the methods described with reference to FIGS. 3-4. In certain examples, some or all of the operations of block 715 may be performed by a data management component as described with reference to FIG. 5.

At block 720, the memory controller may communicate, to a buffer of the device, a second portion of the memory page, the second portion comprising at least a subset of the first data. The operations of block 720 may be performed according to the methods described with reference to FIGS. 3-4. In certain examples, some or all of the operations of block 720 may be performed by a data management component as described with reference to FIG. 5.

At block 725, the memory controller may modify the first value of the prefetch counter based at least in part on a relationship between the first portion of the memory page and the second portion of the memory page. The operations of block 725 may be performed according to the methods described with reference to FIGS. 3-4. In certain examples, some or all of the operations of block 725 may be performed by a prefetch component as described with reference to FIG. 5.

Figure 8:
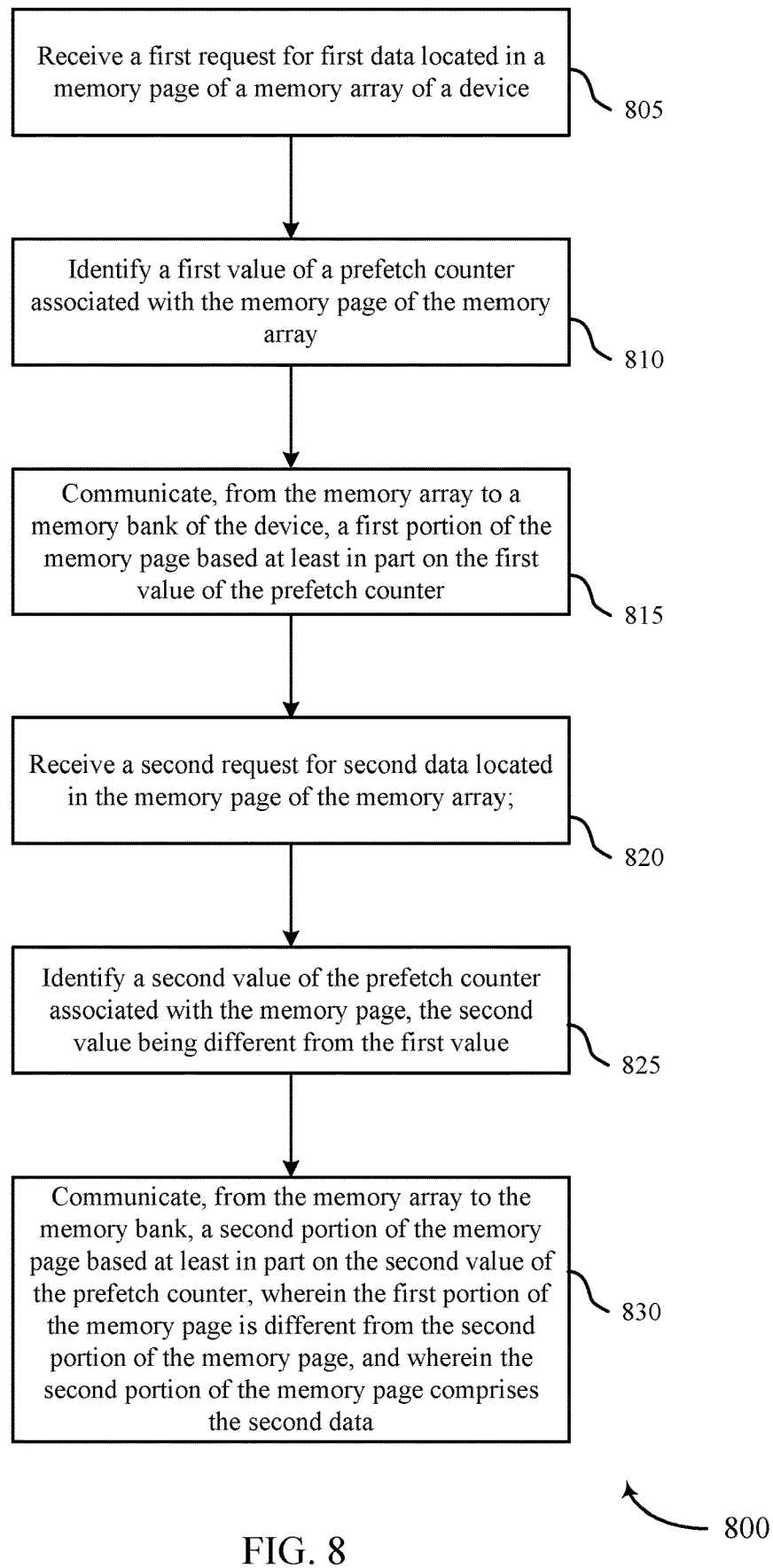

FIG. 8 shows a flowchart illustrating a method 800 for prefetch management for main memory in accordance with examples of the present disclosure. The operations of method 800 may be implemented by a memory system, sub-system, or its components as described herein. For example, the operations of method 800 may be performed by an interface controller, such as interface controller 230, as described with reference to FIG. 2, which may execute a set of codes to control the functional elements of the device to perform the functions below. Additionally or alternatively, the interface controller 230 may perform aspects of the functions described below using special-purpose hardware.

At block 805, the memory controller may receive a first request for first data located in a memory page of a memory array of a device. The operations of block 805 may be performed according to the methods described with reference to FIGS. 3-4. In certain examples, some or all of the operations of block 805 may be performed by a memory interface component as described with reference to FIG. 5.

At block 810, the memory controller may identify a first value of a prefetch counter associated with the memory page of the memory array. The operations of block 810 may be performed according to the methods described with reference to FIGS. 3-4. In certain examples, some or all of the operations of block 810 may be performed by a prefetch component as described with reference to FIG. 5.

At block 815, the memory controller may communicate, from the memory array to a memory bank of the device, data corresponding to a first portion of the memory page based at least in part on the first value of the prefetch counter, the first portion of the memory page including the first data. The operations of block 815 may be performed according to the methods described with reference to FIGS. 3-4. In certain examples, some or all of the operations of block 815 may be performed by a data management component as described with reference to FIG. 5. In some cases, the memory controller writes the first portion of the memory page, or data corresponding to the first portion of the memory page, to the memory bank.

In some cases, the memory controller may communicate, from the memory bank to a buffer of the device, data corresponding to a second portion of the memory array. In some cases, the second portion of the memory array may include the first requested data. The first portion of the memory array may be different than the second portion of the memory array—e.g., the first portion may include three subpages of the memory page, while the second portion of the memory array may include two subpages of the memory page. In some cases, the first portion may include three subpages of the memory page, while the second portion of the memory array may include four subpages of the memory page (e.g., in the event of a subsequent "missed" read).

The memory controller may modify the first value of the prefetch counter based on a relationship between the first portion of the memory page and the second portion of the memory page. For example, the memory controller may determine that the second portion of the memory page is different from the first portion of the memory page, and may modify the first value of the prefetch counter based on determining that the second portion of the memory page is different from the first portion of the memory page. In some cases, the memory controller, causes the buffer to evict the second portion of the memory page (e.g., after a certain time period has elapsed). The memory controller may modify the value of the prefetch counter based on the eviction of the second portion of the memory page. For example, the memory controller may wait to update the prefetch counter until the after the eviction occurs.

After the eviction, the memory controller may adjust the first value of the prefetch counter based on determining that the data corresponding to the first portion of the memory page and the data corresponding to the second portion of the memory page are different. For example, the memory controller may increment the first value of the prefetch counter based on determining that the first portion of the memory page corresponds to fewer subpages than the second portion of the memory page (e.g., the first portion corresponds to three subpages and the second portion corresponds to four subpages). In another example, the memory controller may decrement the value of the prefetch counter based on determining that the first portion of the memory page corresponds to more subpages than the second portion of the memory page. In yet another example, may increment the first value of the prefetch counter based on determining that the first portion of the memory page corresponds to at least one different subpage than the second portion of the memory page.

The memory controller may also monitor a number of access operations performed on the first portion of the memory page, and a second value of the prefetch counter may be based on the monitored number of access operations. For example, the memory controller may monitor a number of access operations performed on each subset, or subpage, of the first portion of the memory page and the number of subsets, or subpages, of the second portion of the memory page may be based on the monitored number of access operations. For instance, the memory controller may choose to include two of three subpages in the second portion of the memory page based on determining that the two subpages included in the second portion were accessed more than a threshold number of time, while the other subpage was accessed less than the threshold number of times.

In some cases, the memory controller may determine that a second request to access certain data in the virtual memory bank or buffer has "missed." Accordingly, memory controller may locate the requested data in the memory array and move the data to the virtual memory bank. In some examples, the second requested data is located in the same memory page as the first requested data, and the memory controller communicates a second portion of the memory page to the virtual memory bank, where the second portion of the memory page is different than the first portion of the memory page and includes the second requested data.

In such a case, the memory controller may communicate data corresponding to a third portion, including data corresponding to subpages from the first portion and subpages from the second portion of the memory page, to the buffer. After the buffer evicts the third portion of the memory page, the memory controller may modify the first value of the memory controller based on a relationship between the first portion, the second portion, and the third portion of the memory array. For instance, if the first portion corresponds to a first set of two subpages, the second portion correspond to a second set of two subpages, and the third portion corresponds to all four subpages, the memory controller may increment the value of the prefetch counter.

At block 820 and after the prefetch counter has been updated to the second value, the memory controller may receive a second request for second data located in the memory page of the memory array. The operations of block 820 may be performed according to the methods described with reference to FIGS. 3-4. In certain examples, some or all of the operations of block 820 may be performed by a memory interface component as described with reference to FIG. 5. In some cases, the second data may be the same as the first data.

At block 825, the memory controller may identify a second value of the prefetch counter associated with the memory page, the second value being different from the first value. The operations of block 825 may be performed according to the methods described with reference to FIGS. 3-4. In certain examples, some or all of the operations of block 825 may be performed by a prefetch component as described with reference to FIG. 5.

At block 830, the memory controller may communicate, from the memory array to the memory bank, a second portion of the memory page based at least in part on the second value of the prefetch counter, wherein the first portion of the memory page is different from the second portion of the memory page, and wherein the second portion of the memory page comprises the second data. The operations of block 830 may be performed according to the methods described with reference to FIGS. 3-4. In certain examples, some or all of the operations of block 830 may be performed by a data management component as described with reference to FIG. 5.

It should be noted that the methods described above describe possible implementations, and that the operations and the steps may be rearranged or otherwise modified and that other implementations are possible. Furthermore, features from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly connected with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The term "electronic communication" and "coupled" refer to a relationship between components that support electron flow between the components. This may include a direct connection between components or may include intermediate components. Components in electronic communication or coupled to one another may be actively exchanging electrons or signals (e.g., in an energized circuit) or may not be actively exchanging electrons or signals (e.g., in a de-energized circuit) but may be configured and operable to exchange electrons or signals upon a circuit being energized. By way of example, two components physically connected via a switch (e.g., a transistor) are in electronic communication or may be coupled regardless of the state of the switch (i.e., open or closed).

A transistor or transistors discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. The illustrative blocks and modules, including memory controllers, may be represented as instructions in IP blocks for use in, for example, ASIC design. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    receiving a request for first data located in a memory page of a memory array of a device;
    identifying a value of a prefetch counter associated with the memory page of the memory array, wherein the value of the prefetch counter indicates a size of data to communicate from the memory array to a memory bank of the device in response to the request for the first data;
    communicating, from the memory array to the memory bank, a set of data having the size indicated by the value of the prefetch counter, the set of data comprising the first data;
    communicating a subset of the set of data from the memory bank to a buffer of the device; and
    modifying the value of the prefetch counter based at least in part on the subset of the set of data communicated to the buffer having a different size than the size indicated by the prefetch counter.

2. The method of claim 1, further comprising:
    writing the set of data to the memory bank; and
    monitoring a number of access operations performed on the set of data in the memory bank, wherein the modified value of the prefetch counter is determined based at least in part on the number of access operations.

3. The method of claim 2, wherein monitoring the number of access operations performed comprises:
    monitoring the number of access operations performed on one or more subsets of the set of data in the memory bank.

4. The method of claim 3, wherein the one or more subsets comprises the subset of the set of data, further comprising:
    determining that a first number of access operations performed on the subset of the of the set of data satisfies a threshold,
    wherein the subset of the set of data is communicated to the buffer of the device based at least in part on the determining.

5. The method of claim 1, further comprising:
    receiving a second request for second data located in the memory page of the memory array; and
    communicating, from the memory array to the memory bank, a second set of data comprising the second data, wherein the first data is stored in a first section of the memory page that is different from a second section of the memory page that stores the second data.

6. The method of claim 5, further comprising:
    communicating, from the memory bank to the buffer of the device, a second subset of the second set of data; and
    modifying the value of the prefetch counter based at least in part on a relationship between the set of data, the second set of data, or the second subset of the second set of data, or any combination thereof.

7. The method of claim 1, further comprising:
    receiving a second request for second data located in the memory page of the memory array;
    identifying the modified value of the prefetch counter associated with the memory page, wherein the modified value is different from the value; and
    communicating, from the memory array to the memory bank, a second set of data stored in a second section of the memory page that comprises the second data based at least in part on the modified value of the prefetch counter, wherein the set of data is stored in a first section of the memory page that is different from the second section of the memory page.

8. A method, comprising:
    receiving a first request for first data located in a memory page of a memory array of a device;
    identifying a first value of a prefetch counter associated with the memory page of the memory array, wherein the first value of the prefetch counter identifies a size of a first portion of the memory page to communicate from the memory array to a memory bank of the device;
    communicating, from the memory array to the memory bank of the device, the first portion of the memory page based at least in part on the first value of the prefetch counter identifying the size of the first portion of the memory page comprising the first data;

communicating, to a buffer of the device, a second portion of the memory page, the second portion comprising at least a subset of the first data;

determining that the second portion of the memory page is different from the first portion of the memory page; and modifying the first value of the prefetch counter based at least in part on determining that the second portion of the memory page is different from the first portion of the memory page.

9. The method of claim 8, further comprising:

evicting, by the buffer, the second portion of the memory page, wherein the first value of the prefetch counter is modified based at least in part on evicting the second portion of the memory page.

10. An apparatus, comprising:

a memory array configured to store data in a first memory page configured with a first memory page size;

a memory bank configured to store data in a second memory page configured with a second memory page size different from the first memory page size; and a prefetch counter associated with the first memory page, the prefetch counter configured to store a value that indicates a size of a set of data to communicate to the memory bank in response to a request for first data located in the first memory page, the set of data comprising the first data;

a buffer configured to receive a subset of the set of data from the memory bank; and a controller configured to modify the value of the prefetch counter based at least in part on a difference in size between the set of data communicated to the memory bank and the subset of the set of data communicated to the buffer.

11. The apparatus of claim 10, further comprising:

a second counter configured to monitor a number of access operations performed on the set of data in the memory bank, wherein the subset of the set of data is based at least in part on a second value of the second counter.

12. The apparatus of claim 11, wherein the controller is configured to monitor access operations performed on the set of data in the memory bank.

13. The apparatus of claim 10, wherein the first memory page is partitioned into a plurality of subsets of the first memory page.

14. The apparatus of claim 10, wherein the memory array is configured to store a plurality of memory pages each configured with the first memory page size, the apparatus further comprising:

a plurality of prefetch counters each associated with a corresponding memory page of the plurality of memory pages, wherein each of the plurality of prefetch counters is configured to store a respective value corresponding to a respective portion of a respective memory page, and wherein the respective portion is responsive to a respective request for data located in the respective memory page.

15. An apparatus, comprising:

a memory array configured to store data in a first memory page configured with a first memory page size;

a memory bank configured to store data in a second memory page configured with a second memory page size different from the first memory page size;

a prefetch counter, wherein a value of the prefetch counter is associated with the first memory page; and a controller coupled with the memory array, the memory bank, and configured to interface with a host, the controller operable to:

receive a request for first data located in a memory page of the memory array;

identify the value of the prefetch counter, wherein the value of the prefetch counter indicates a size of data to communicate from the memory array to the memory bank;

communicate, from the memory array to the memory bank, a set of data having the size indicated by the value of the prefetch counter, the set of data comprising the first data;

communicate a subset of the set of data from the memory bank to a buffer of the apparatus; and modify the value of the prefetch counter based at least in part on the subset of the set of data communicated to the buffer having a different size than the size indicated by the prefetch counter.

16. The apparatus of claim 15, wherein the controller is operable to:

monitor a number of access operations performed on the set of data, wherein the modified value of the prefetch counter is determined based at least in part on the number of access operations.

17. The apparatus of claim 16, wherein the controller is operable to:

monitor the number of access operations performed on one or more subsets of the set of data.

18. An apparatus, comprising:

a memory array configured to store data in a first memory page configured with a first memory page size;

a memory bank configured to store data in a second memory page configured with a second memory page size different from the first memory page size;

a prefetch counter, wherein a first value of the prefetch counter is associated with the first memory page;

a buffer; and a controller coupled with the memory array, the memory bank, and configured to interface with a host, the controller operable to:

receive a first request for first data located in the first memory page;

identify the first value of the prefetch counter, wherein the first value of the prefetch counter identifies a size of a first portion of the first memory page to communicate from the memory array to the memory bank of the apparatus;

communicate, from the memory array to the memory bank, the first portion of the first memory page based at least in part on the first value of the prefetch counter identifying the size of the first memory page comprising the first data;

communicate, from the memory bank to the buffer, a second portion of the first memory page; and determine that the second portion of the first memory page is different from the first portion of the first memory page, wherein the first value of the prefetch counter is modified based at least in part on determining that the second portion of the first memory page is different from the first portion of the first memory page.

* * * * *